United States Patent
Hollenbeck et al.

(10) Patent No.: US 6,864,616 B2
(45) Date of Patent: Mar. 8, 2005

(54) METHOD AND APPARATUS FOR FORMING AN ELECTRIC MOTOR HAVING STACKED LAMINATIONS

(75) Inventors: Robert K. Hollenbeck, Fort Wayne, IN (US); Dennis P. Bobay, Ossian, IN (US); David M. Erdman, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 09/974,522

(22) Filed: Oct. 9, 2001

(65) Prior Publication Data

US 2003/0067243 A1 Apr. 10, 2003

(51) Int. Cl.$^7$ ................................................ H02K 1/12
(52) U.S. Cl. ...................... 310/257; 310/156.46; 310/43
(58) Field of Search ............................... 310/67 R, 257, 310/42, 43, 156.38–156.47

(56) References Cited

U.S. PATENT DOCUMENTS

| | | | | |
|---|---|---|---|---|
| 3,495,111 A | * | 2/1970 | Haydon | ................. 310/156.21 |
| 3,609,423 A | * | 9/1971 | Spring et al. | ................. 310/82 |
| 4,074,157 A | * | 2/1978 | Lace | ......................... 310/67 R |
| 4,841,190 A | * | 6/1989 | Matsushita et al. | ......... 310/257 |
| 4,845,424 A | | 7/1989 | Gamble | |
| 5,365,132 A | | 11/1994 | Hann et al. | |
| 5,808,390 A | * | 9/1998 | Miyazawa et al. | .......... 310/194 |
| 5,945,765 A | * | 8/1999 | Chen | .......................... 310/257 |
| 5,990,595 A | | 11/1999 | Crowell | |
| 6,013,966 A | * | 1/2000 | Fehrenbacher et al. | ...... 310/257 |
| 6,131,268 A | | 10/2000 | Neuenschwander | |
| 6,198,194 B1 | | 3/2001 | Vyas | |
| 6,227,819 B1 | | 5/2001 | Gettel et al. | |
| 6,227,822 B1 | | 5/2001 | Chen | |
| 6,281,616 B1 | * | 8/2001 | Burgbacher et al. | ........ 310/257 |
| 6,301,773 B1 | | 10/2001 | Chemburkar | |
| 6,304,018 B1 | | 10/2001 | Ham et al. | |
| 6,441,531 B1 | * | 8/2002 | Horng et al. | ................ 310/216 |

* cited by examiner

Primary Examiner—Dang Le
(74) Attorney, Agent, or Firm—Karl A. Vick, Esq.; Armstrong Teasdale LLP

(57) ABSTRACT

An electric motor including a stator, a rotor, and a housing adapted to support the stator and the rotor is provided. The stator includes a stator core, a first and second lamination stack, a flux tube extending therethrough, and windings on the stator core. The rotor includes a hub having an inner surface, a magnet coupled to the hub inner surface, and a shaft received in the stator core for rotation of the rotor relative to the stator about the longitudinal axis of the shaft.

25 Claims, 21 Drawing Sheets

*TINPS IS COMMUNICATION PERIOD, 8μs PER BIT

METHOD AND APPARATUS FOR FORMING AN ELECTRIC MOTOR HAVING STACKED LAMINATIONS

BACKGROUND OF THE INVENTION

This invention relates generally to electric motors and more particularly to an electric motor having stacked laminations.

Assembly of electric motors requires that a rotor be mounted for rotation relative to a stator so that magnets on the rotor are generally aligned with one or more windings on the stator. Conventionally, this is done by mounting a shaft of the rotor on a frame which is attached to the stator. The stator can include stacks of laminations. The shaft is received through the stator so that it rotates about the axis of the stator. The frame or a separate shell may be provided to enclose the stator and rotor. In addition to these basic motor components, control components are also assembled. An electrically commutated motor may have a printed circuit board mounting various components. Assembly of the motor requires electrical connection of the circuit board components to the winding and also providing for electrical connection to an exterior power source. The circuit board itself is secured in place, typically by an attachment to the stator with fasteners, or by welding, soldering or bonding. Many of these steps are carried out manually and have significant associated material labor costs.

Tolerances of the component parts of the electric motor must be controlled so that in all of the assembled motors, the rotor is free to rotate relative to the stator without contacting the stator. A small air gap between the stator and the magnets on the rotor is preferred for promoting the transfer of magnetic flux between the rotor and stator, while permitting the rotor to rotate. The tolerances in the dimensions of several components may have an effect on the size of the air gap.

Motors are commonly programmed to operate in certain ways desired by the end user of the motor. For instance certain operational parameters may be programmed into the printed circuit board components, such as speed of the motor, delay prior to start of the motor, and other parameters. Mass produced motors are most commonly programmed in the same way prior to final assembly and are not capable of reprogramming following assembly. However, the end users of the motor sometimes have different requirements for operation of the motor. In addition, the end user may change the desired operational parameters of the motor. For this reason, large inventories of motors, or at least programmable circuit boards, are kept to satisfy the myriad of applications.

Electric motors have myriad applications, including those which require the motor to work in the presence of water. Water is detrimental to the operation and life of the motor, and it is vital to keep the stator and control circuitry free of accumulations of water. It is well known to make the stator and other components water proof. However, for mass produced motors it is imperative that the cost of preventing water from entering and accumulating in the motor be kept to a minimum. An additional concern when the motor is used in the area of refrigeration is the formation of ice on the motor. Not uncommonly the motor will be disconnected from its power source, or damaged by the formation of ice on electrical connectors plugged into the circuit board. Ice which forms between the printed circuit board at the plug-in connector can push the connector away from the printed circuit board, causing disconnection, or breakage of the board or the connector.

BRIEF DESCRIPTION OF THE INVENTION

In one aspect, an electric motor includes a stator, a rotor, and a housing adapted to support the stator and the rotor. The stator includes a stator core, a first and second lamination stack, a flux tube extending therethrough, and windings on the stator core. The rotor includes a hub having an inner surface, a magnet coupled to the hub inner surface, and a shaft received in the stator core for rotation of the rotor relative to the stator about the longitudinal axis of the shaft.

In another aspect, an electric motor includes a stator, rotor, and a housing adapted to support the stator and the rotor. The stator includes a stator core, a first and second lamination stack, a flux tube extending therethrough, and a winding on the stator core. Each lamination stack includes a plurality of laminations configured to be stacked together. Each lamination includes a body having an outer edge, a central opening aligned with the stator core central opening and configured to receive the flux tube, a plurality of pole pieces extending axially from the lamination outer edge, and a notch extending through the lamination body from the lamination body central opening to the lamination body outer edge. The rotor includes a hub having fan blades projecting radially outwardly from the hub, an inner surface, a magnet coupled to the hub inner surface, and a shaft received in the stator core for rotation of the rotor relative to the stator about the longitudinal axis of the shaft.

In another aspect, a method of assembling an electric motor is provided. The method employs a stator including a stator core, a first and second lamination stack, a flux tube extending therethrough, and a winding wound on the stator core. The method also employs a rotor having a shaft and a hub with a magnet therein. The rotor being mounted for rotation relative to the stator about a longitudinal axis of the rotor shaft. The method comprises forming the stator, forming the rotor, forming a housing adapted to support and at least partially enclose the stator and rotor, mounting the rotor on the stator by inserting the shaft through the stator to form a stator/rotor subassembly, and snap connecting the stator/rotor subassembly to the housing.

BRIEF DESCRIPTION OF THE DRAWINGS

Corresponding reference characters indicate corresponding parts throughout the several views of the drawings.

DETAILED DESCRIPTION OF THE INVENTION

Figure 1:
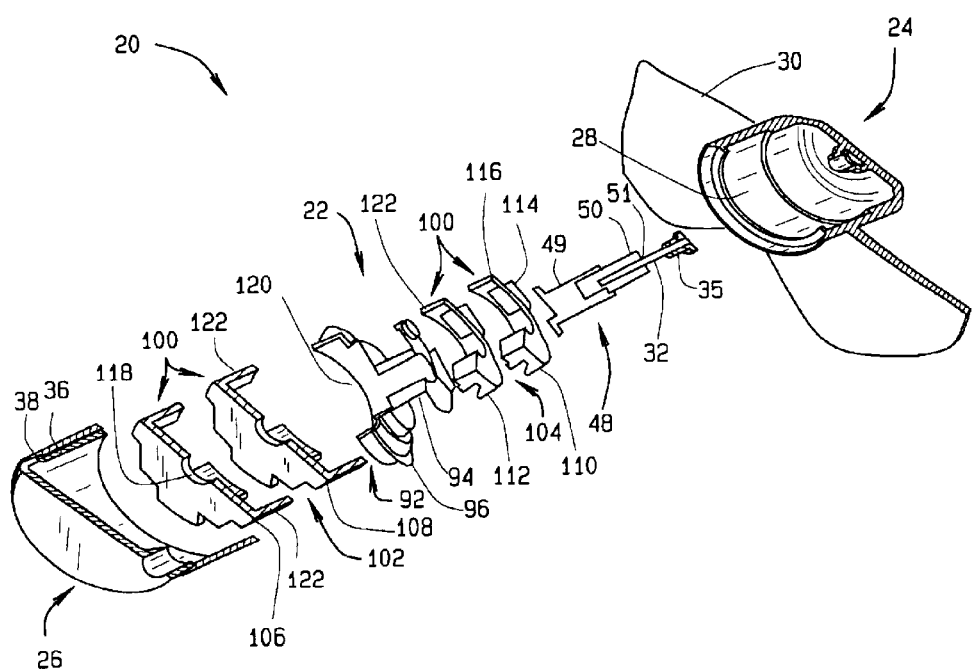
FIG. 1 is an exploded elevational view of an electric motor in the form of a fan.
Figure 2:
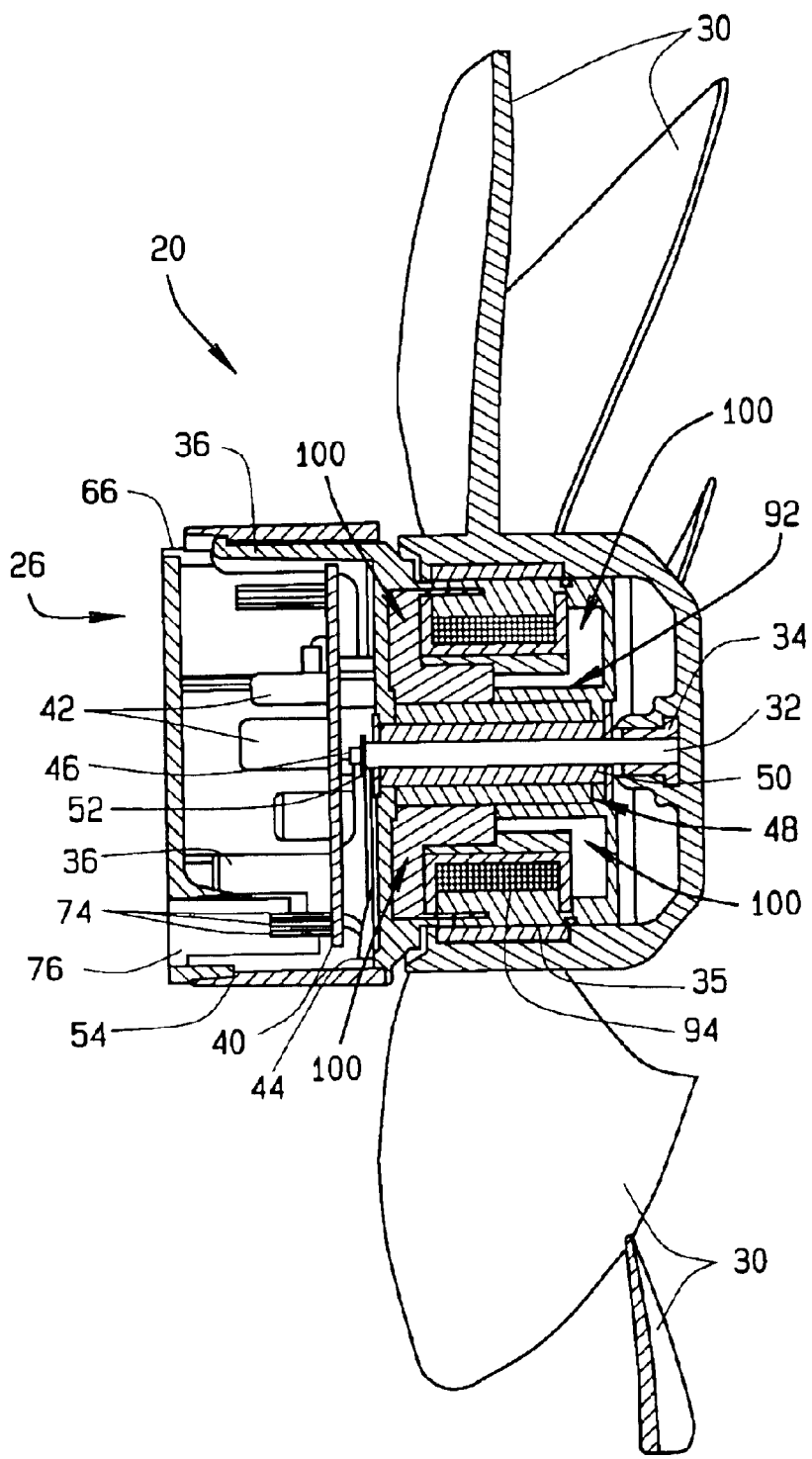
FIG. 2 is a vertical cross sectional view of the assembled motor.

Referring now to the drawings, and in particular to FIGS. 1 and 2, an electric motor 20 constructed according to the principles of the present invention includes a stator 22, a rotor 24 and a housing 26 (the reference numerals designating their subjects generally). In the illustrated embodiment, the motor 20 is of the type which the rotor magnet (discussed in detail below) is on the outside of the stator, and is shown in the form of a fan. Accordingly, the rotor 24 includes a hub 28 having fan blades 30 formed integrally therewith and projecting radially from the hub. The hub 28 and fan blades 30 are formed as one piece of a polymeric material. The hub is open at one end and defines a cavity in which a rotor shaft 32 is mounted on the axis of the hub (FIG. 2). The shaft 32 is attached to the hub 28 by a insert 34 which is molded into the hub, along with the end of the shaft when the hub and fan blades 30 are formed. A rotor magnet 35 includes a magnetic material with or without iron backing. For simplicity, the rotor magnet 35 is shown as a unitary material in the drawings. The magnet with or without back iron is also molded into the hub cavity at the time the hub is formed or later attached to the hub.

The stator shown in FIG. 1 is not encapsulated and the stator shown in FIG. 2 is encapsulated. The stator 22, which will be described in further detail below, is substantially encapsulated in a thermoplastic material. The encapsulating material also forms legs 36 projecting axially of the stator 22. For the embodiment shown in FIG, 1, an annular ring is used for attachment. The legs 36 each have a catch 38 formed at the distal end of the leg. A printed circuit board generally indicated at 40, is received between the legs 36 in the assembled motor 20, and includes components 42, at least one of which is programmable, mounted on the board. A finger 44 projecting from the board 40 mounts a Hall device 46 which is received inside the encapsulation when the circuit board is disposed between the legs 36 of the stator 22. In the assembled motor 20, the Hall device 46 is in close proximity to the rotor magnet 35 for use in detecting rotor position to control the operation of the motor. The stator 22 also includes a flux tube generally indicated at 48 including a steel tube 49 with a bronze bearing 50 press fitted into steel tube 49. Flux tube 48 has a slit 51 extending axially along steel tube 49 to facilitate a reduction in circulating flux. The flux tube has a lip on one end. On the other end, a clip is used to secure the upper laminations to the stator and lower lamination assembly. Slit 51 in flux tube 48 is aligned with a notch provided on upper and lower lamination assemblies. The bearing 50 receives the rotor shaft 32 through the stator 22 for mounting the rotor 24 on the stator to form a subassembly. The rotor 24 is held on the stator 22 by an E clip 52 attached to the free end of the rotor after it is inserted through the stator.

Small openings 66 in the closed end housing 26 (FIG. 2) permit a tool (not shown) to be inserted into the cup to pry the legs 36 off of the shoulders 64 for releasing the connection of the stator/rotor subassembly from the cup. Thus, it is possible to nondestructively disassemble the motor 20 for repair or reconfiguration (e.g., such as by replacing the printed circuit board 40). The motor may be reassembled by simply reinserting the legs 36 into housing 26 until they snap into connection.

Figure 4:
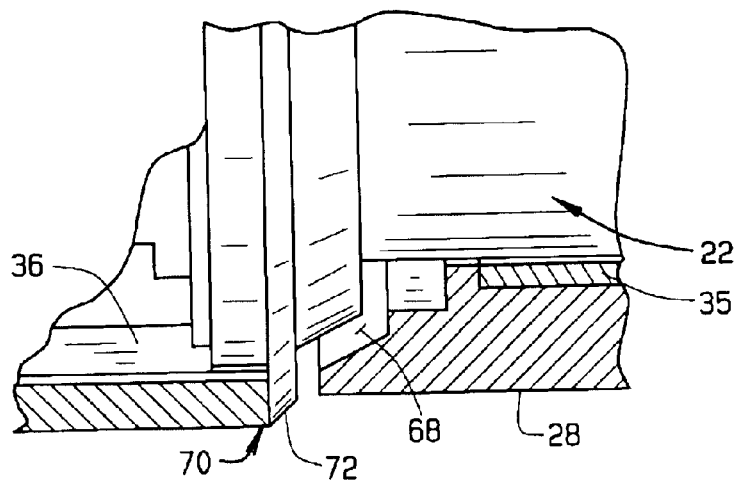
FIG. 4 is a greatly enlarged, fragmentary view of the motor at the junction of a rotor hub with the stator is a side elevational view of a flux tube and rotor shaft bearing.

One application for motor 20 in the illustrated embodiment is as an evaporator fan in a refrigerated case. In this environment, the motor will be exposed to water. For instance, the case may be cleaned out by spraying water into the case. Water tends to be sprayed onto the motor 20 from above and to the right of the motor in the orientation shown in FIG. 2, and potentially may enter the motor wherever there is an opening or joint in the construction of the motor. The encapsulation of the stator 22 provides protection, but it is desirable to limit the amount of water which enters the motor. One possible site for entry of water is at the junction of the hub 28 of the rotor and the stator 22. An enlarged fragmentary view of this junction is shown in FIG. 4. The thermoplastic material encapsulating the stator is formed at this junction to create a tortuous path 68. Moreover, a skirt 70 is formed which extends radially outwardly from the stator. An outer edge 72 of the skirt 70 is beveled so that water directed from the right is deflected away from the junction.

Figure 5:
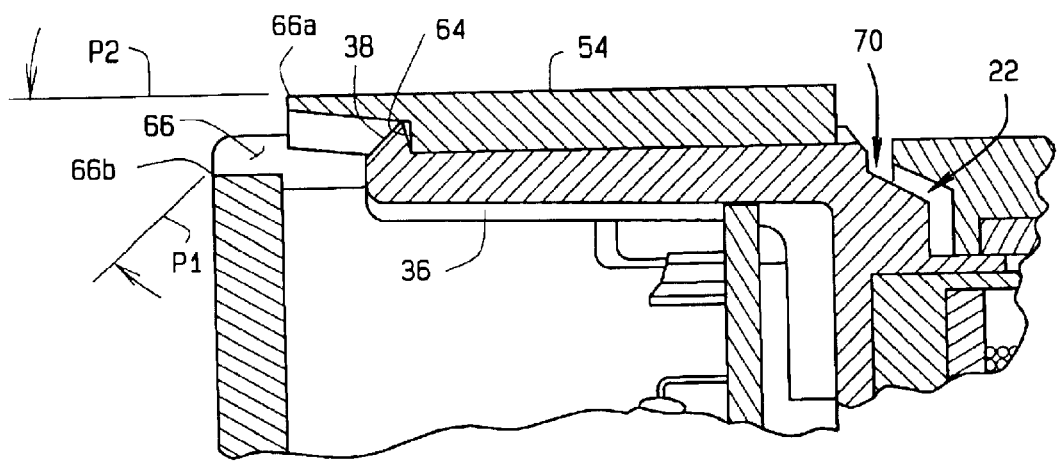
FIG. 5 is an enlarged, fragmentary view of the motor illustrating snap connection of the stator/rotor subassembly with the shroud.

The openings 66 which permit the connection of the stator/rotor subassembly to be released are potentially susceptible to entry of water into the cup where it may interfere with the operation of the circuit board. The printed circuit board 40, including the components 42, is encapsulated to protect it from moisture. However, it is still undesirable for substantial water to enter housing 26. Accordingly, the openings 66 are configured to inhibit entry of water. Referring now to FIG. 5, a greatly enlarged view of one of the openings 66 shows a radially outer edge 66a and a radially inner edge 66b. These edges lie in a plane P1 which has an angle to a plane P2 generally parallel to the longitudinal axis of the rotor shaft of at least about 45°. It is believed that water is sprayed onto the motor at an angle of no greater than 45°. Thus, water has no direct path to enter the opening 66 when it travels in a path making an angle of 45° or less. The water will either strike the side of the cup 54 or pass over the opening, but will not enter the opening.

The housing 26 is also constructed to inhibit motor failures which can be caused by the formation of ice within the cup when the motor 20 is used in a refrigerated environment. More particularly, the printed circuit board 40 has power contacts 74 mounted on and projecting outwardly from the circuit board. These contacts are aligned with an inner end of a plug receptacle 76 which is formed in the cup 54. Referring to FIG. 2, the receptacle 76 receives a plug (not shown) connected to an electrical power source remote from the motor. External controls (not shown) are also connected to the printed circuit board 40 through the plug 78. The receptacle 76 and the plug 78 have corresponding, rectangular cross sections so that when the plug is inserted, it substantially closes the plug receptacle.

When the plug is fully inserted into the plug receptacle 76, the power contacts 74 on the printed circuit board 40 are received in the plug, but only partially. The plug receptacle 76 is formed with tabs 80 (near its inner end) which engage the plug and limit the depth of insertion of the plug into the receptacle. As a result, the plug is spaced from the printed circuit board 40 even when it is fully inserted in the plug receptacle 76. In the preferred embodiment, the spacing is about 0.2 inches. However, it is believed that a spacing of about 0.05 inches would work satisfactorily. Notwithstanding the partial reception of the power contacts 74 in the plug, electrical connection is made. The exposed portions of the power contacts 74, which are made of metal, tend to be subject to the formation of ice when the motor 20 is used in certain refrigeration environments. However, because the plug and circuit board 40 are spaced, the formation of ice does not build pressure between the plug and the circuit board which would push the plug further away from the circuit board, causing electrical disconnection. Ice may and will still form on the exposed power contacts 74, but this will not cause disconnection, or damage to the printed circuit board 40 or the plug.

Figure 6:
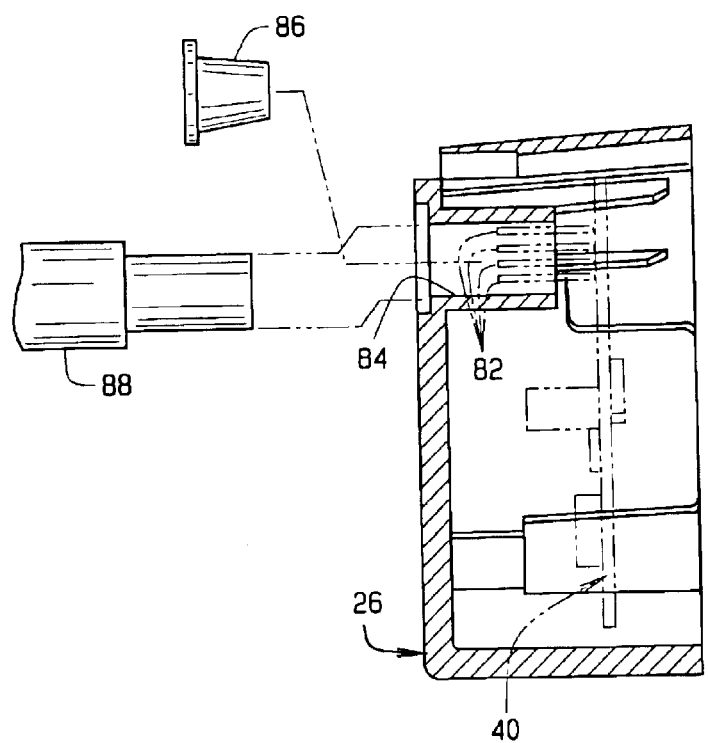
FIG. 6 is a section taken in the plane including line 13—13 of FIG. 3, showing the printed circuit board in phantom and illustrating connection of a probe to a printed circuit board in the shroud and a stop.
Figure 7:
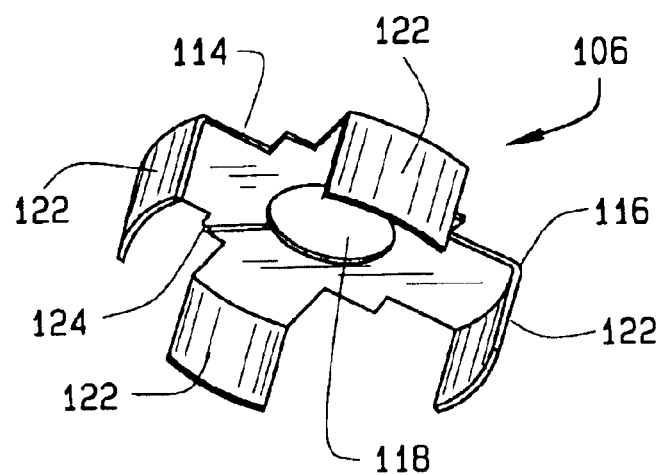
FIG. 7 is an elevational view of a larger lamination.
Figure 8:
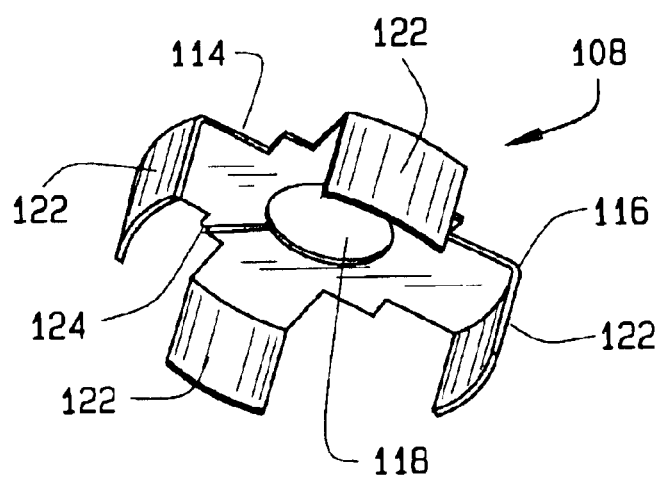
FIG. 8 is an elevational view of a smaller lamination.
Figure 9:
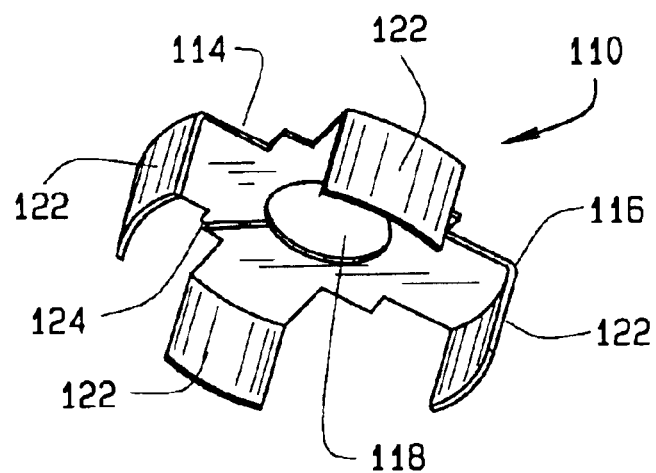
FIG. 9 is an elevational view of another larger lamination.
Figure 10:
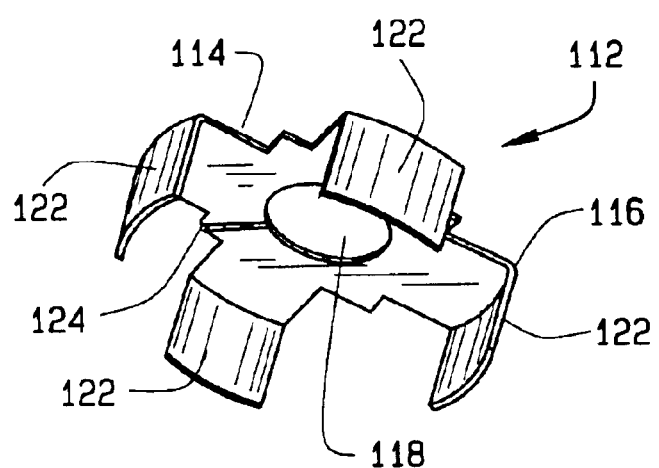
FIG. 10 is an elevational view of another smaller lamination.

As shown in FIG. 6, the printed circuit board 40 also has a separate set of contacts 82 used for programming the motor 20. These contacts 82 are aligned with a tubular port 84 formed in housing 26 which is normally closed by a stop 86 removably received in the port. When the stop 86 is removed the port can receive a probe 88 into connection with the contacts 82 on the circuit board 40. The probe 88 is connected to a microprocessor or the like (not shown) for programming or, importantly, re-programming the operation of the motor after it is fully assembled. For instance, the speed of the motor can be changed, or the delay prior to starting can be changed. Another example in the context of refrigeration is that the motor can be reprogrammed to operate on different input, such as when demand defrost is employed. The presence of the port 84 and removable stop 86 allow the motor to be re-programmed long after final assembly of the motor and installation of the motor in a given application.

Figure 3:
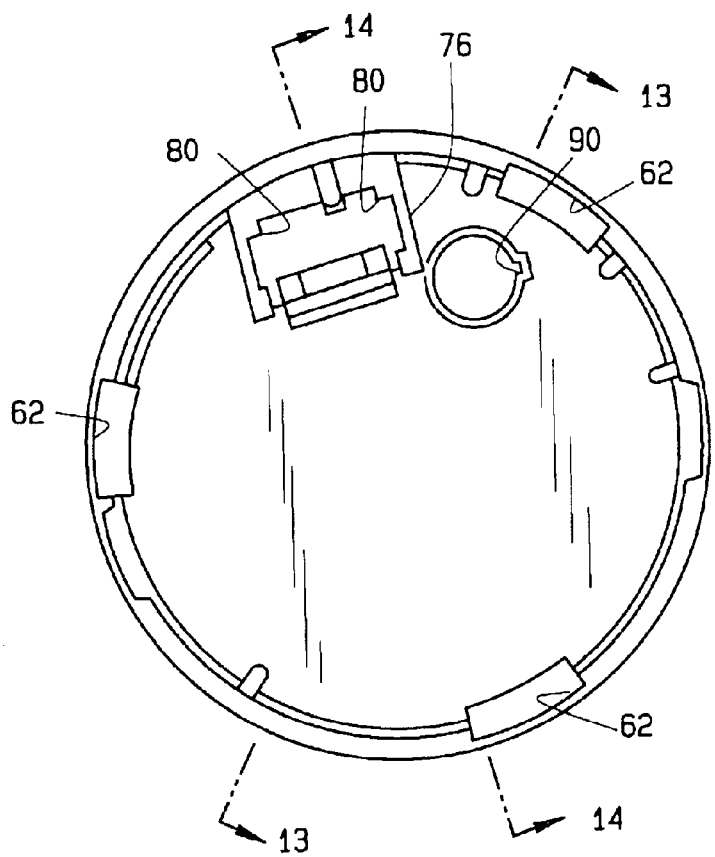
FIG. 3 is an enlarged, fragmentary view of the shroud of FIG. 1 as seen from the right side.

The port 84 is keyed so that the probe can be inserted in only one way into the port. As shown in FIG. 3 the key is manifested as a trough 90 on one side of the port 84. The probe has a corresponding ridge which is received in the trough when the probe is oriented in the proper way relative to the trough. In this way, it is not possible to incorrectly connect the probe 88 to the programming contacts. If the probe 88 is not properly oriented, it will not be received in the port 84.

Figure 11:
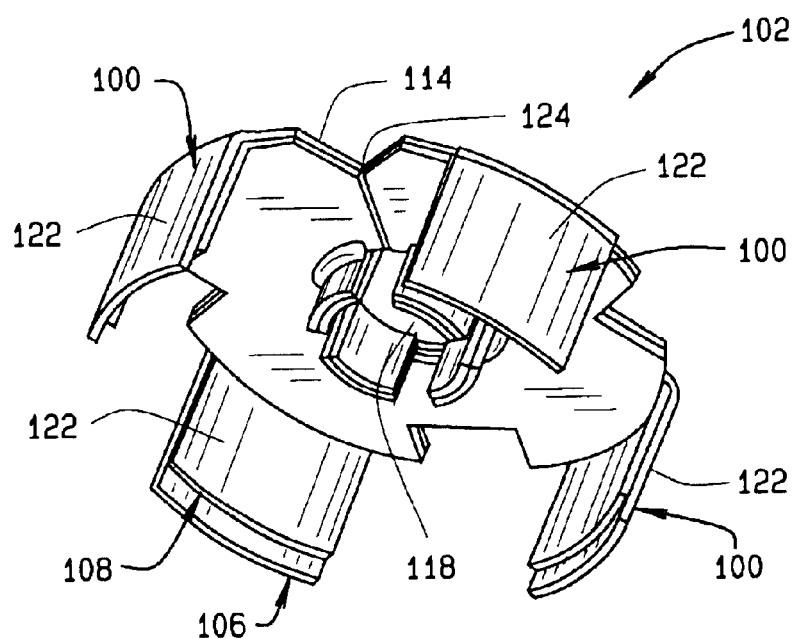
FIG. 11 is an elevational view of the larger lamination shown in FIG. 7 stacked onto the smaller lamination shown in FIG. 8.
Figure 12:
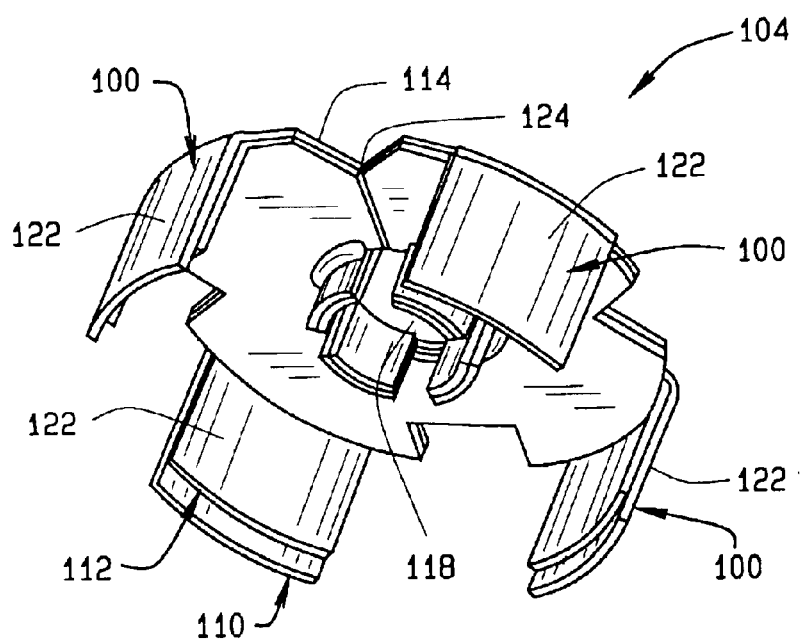
FIG. 12 is an elevational view of the larger lamination shown in FIG. 9 stacked onto the smaller lamination shown in FIG. 10.

As shown in FIGS. 1 and 7–10, the stator includes a stator core (or bobbin), generally indicated at 92, made of a polymeric material and a winding 94 wound around the core. The winding leads are terminated at a terminal pocket 96 formed as one piece with the stator core 92 by terminal pins 98 (not shown) received in the terminal pocket. The terminal pins 98 are attached in a suitable manner, such as by soldering to the printed circuit board 40 (shown in FIG. 2). However, it is to be understood that other ways of making the electrical connection can be used without departing from the scope of the present invention. It is envisioned that a plug-in type connection (not shown) could be used so that no soldering would be necessary In the exemplary embodiment, the ferromagnetic material for conducting the magnetic flux in the stator 22 is provided by eight distinct pole pieces, generally indicated at 100, on a first and second lamination stack 102 and 104, respectively. Each of first and second lamination stacks 102 and 104, respectively, includes at least two laminations 106, 108, 110, and 112, respectively. First stack laminations 106 and 108 are configured to stack onto each other in alignment with stator core 92. Second stack laminations 110 and 112 are also configured to stack onto each other in alignment with stator core 92. Each lamination 106, 108, 110, and 112 has a body 114 with an outer edge 116 and a central opening 118 extending therethrough which is aligned with a stator core central opening 120. In the exemplary embodiment, each lamination 106, 108, 110, and 112 has four pole pieces 122 extending axially at substantially right angles to lamination body 114 at lamination outer edge 116. First stack laminations 106 and 108 are mechanically coupled onto each other with pole pieces 122 on lamination 106 aligned with pole pieces 122 on lamination 108 (FIG. 11). Second stack laminations 110 and 112 are also mechanically coupled onto each other with pole pieces 122 on lamination 110 aligned with pole pieces 122 on lamination 112 (FIG. 12). Each lamination 106, 108, 110, and 112 also has a notch 124.

Poles 100 are each preferably formed by bending each pole piece 122 at substantially right angles to lamination body 114 after lamination body 114 is formed by stamping. Laminations 106, 108, 110, and 112 are secured together in a suitable manner, such as by nesting or mechanical interlock. In the exemplary embodiment, first stack lamination 106 is larger than first stack lamination 108, and second stack lamination 110 is larger than second stack lamination 112. This allows lamination 106 to be stacked onto lamination 108, and lamination 110 to be stacked onto lamination 112.

The pole pieces 100 could also be molded from magnetic material without departing from the scope of the present invention. In certain, low power applications, there could be a single pole piece stamped from metal (not shown), but having multiple (e.g., four) legs defining the pole piece bent down to extend axially across the winding.

The pole pieces 100 are held and positioned by the stator core 92 and a flux tube, generally indicated at 48 (FIG. 1). Flux tube 48 includes an outer steel tube 49 and a bronze bearing 50 press fitted within steel tube 49. A central bore 51 extends through flux tube 48 configured to receive rotor shaft 32. Flux tube 48 is configured to align first and second stack laminations 102 and 104, respectively, with stator core 92.

Figure 13:
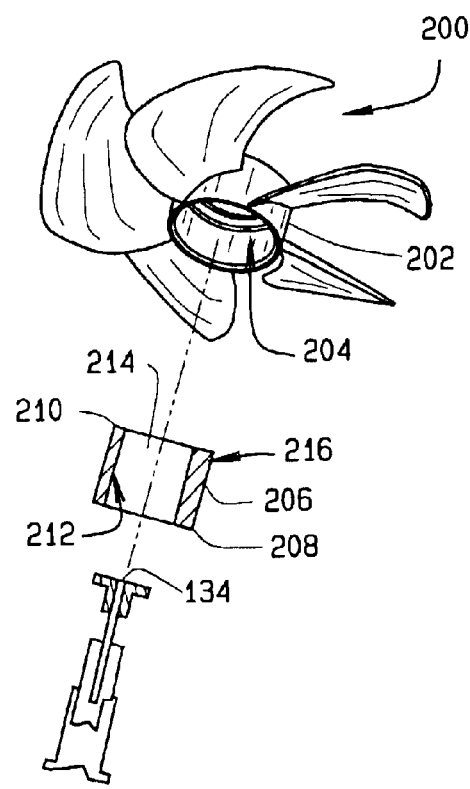
FIG. 13 is an exploded elevational view of a rotor for an electric motor in the form of a fan.

FIG. 13 shows a rotor 200 including a hub 202 having an inner surface 204, a magnet 206 coupled to hub inner surface 204, and a rotor shaft 134 received in stator core 92 (shown in FIG. 1) for rotation of rotor 200 relative to the stator. Magnet 206 includes a first end 208, a second end 210, an inner surface 212 defining a bore 214 extending through the magnet such that a portion of the stator and rotor shaft 134 extend through magnet 206, and an outer surface 216. In the exemplary embodiment, motor 20 is a relatively low cost motor, and thus, favorably positioning, also known as parking, the rotor relative to the stator for starting purposes is not required. Thus, in the exemplary embodiment, a smooth magnet inner surface 212 is shown which does not facilitate parking. However, if parking the rotor relative to the stator is a desired feature, as discussed below, magnet inner surface 212 can be designed with a non-uniform surface creating a non-uniform air gap between the rotor and the stator such that parking is provided.

In one embodiment of magnet 206 (FIG. 14), magnet inner surface 212 has a plurality of projections 218 extending between magnet first end 208 and magnet second end 210. Projections 218 include a first and second side wall 220 and 222, respectively extending from magnet inner surface 212 toward magnet bore 214 at an obtuse angle with respect to the magnet inner surface 212 wherein the notches are configured to a predetermined height 224.

Figure 15:
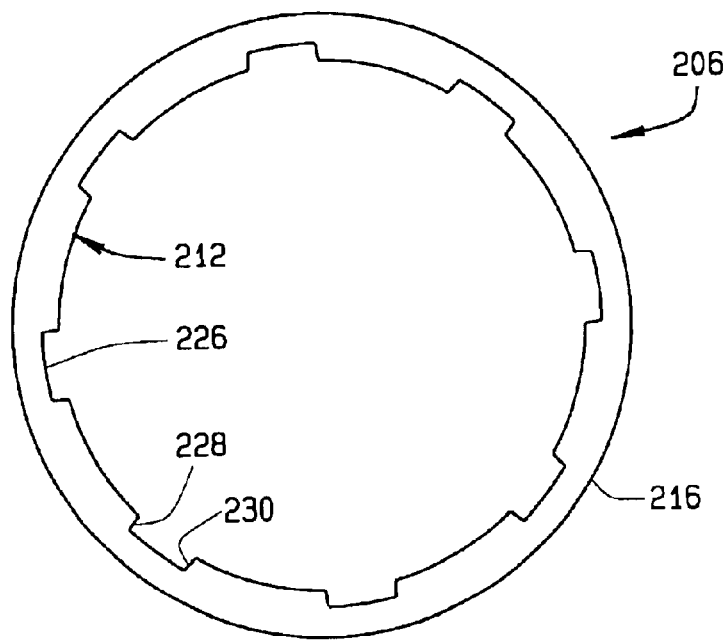
FIG. 15 is a plan view of another embodiment of the magnet used within the electric motor shown in FIG. 1.

In another embodiment of magnet 206 (FIG. 15), magnet inner surface 212 has a plurality of notches 226 extending between magnet first end 208 and magnet second end 210. Notches 226 include a first side wall 228 extending along the radial direction and a second wall 230 extending at an obtuse angle with respect to the bottom of the notch, wherein notches 226 are smaller than the magnet portion beneath the notch.

Figure 16:
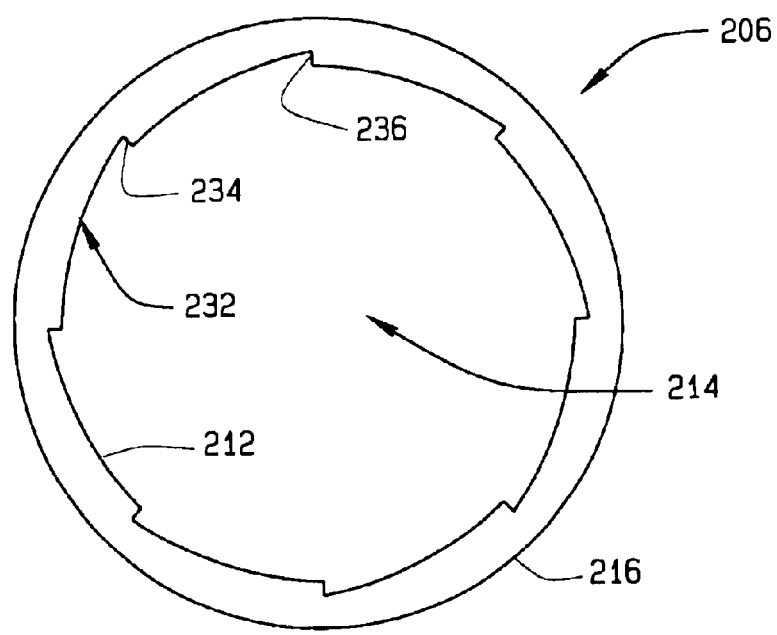
FIG. 16 is a plan view of a third embodiment of the magnet used within the electric motor shown in FIG. 1.

In a further embodiment of magnet 206 (FIG. 16), magnet inner surface 212 has a plurality of serrations 232 extending between magnet first end 208 and magnet second end 210. Serrations 232 include a first and second side wall 234 and 236, respectively, extending along the radial direction toward magnet bore 214.

Figure 17:
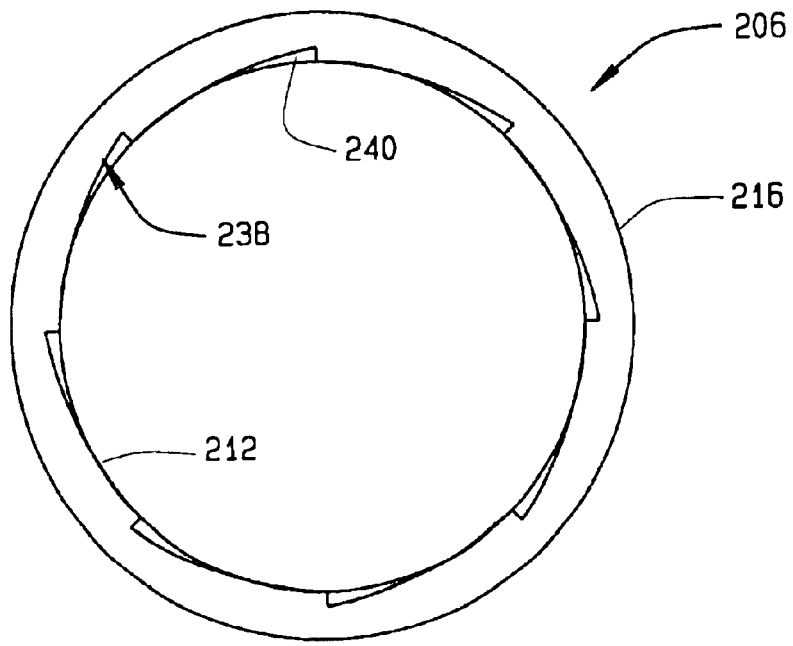
FIG. 17 is a plan view of a fourth embodiment of the magnet used within the electric motor shown in FIG. 1.

In a further embodiment of magnet 206 (FIG. 17), magnet inner surface 212 has a plurality of skewed serrations 238 extending between magnet first end 208 and magnet second end 210. Skewed serrations 238 include an angled side wall 240 extending along skewed serration 238.

Figure 18:
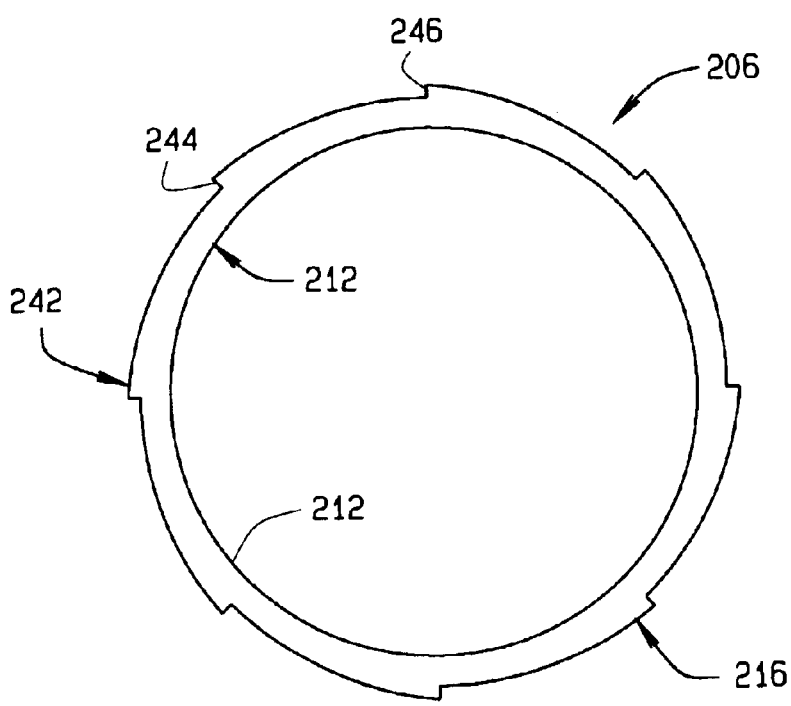
FIG. 18 is a plan view of a fifth embodiment of the magnet used within the electric motor shown in FIG. 1.

In a further embodiment of magnet 206 (FIG. 18), magnet outer surface 216 has a plurality of serrations 242 extending between magnet first end 208 and magnet second end 210. Serrations 242 include a first and second side wall 244 and 246, respectively, extending along the radial direction toward rotor hub 202 (not shown).

Projections 218, notches 226, serrations 232, skewed serrations 238, and serrations 242 on magnet outer surface 216 to vary the air gap between the rotor and the stator. The various embodiments of magnet 206 shown herein allow the rotor to be positioned favorably for starting as a result of the torque produced by the non-uniformity of the air gap. A plurality of various shapes can be used on magnet 206 to create the non-uniform air gap. It is not limited to the shapes described herein.

Motor 20 is designed to be a low cost motor with a medium efficiency rating. This result is accomplished through the embodiments described above for the lamination stacks, the rotor magnet, the stator core, and the flux tube assembly. Consequently, in one embodiment, motor 20 is able to achieve an efficiency in the range of 30% to 60% at a relatively low cost. In a further embodiment, motor 20 is able to achieve an efficiency in the range of 35% to 50% at a relatively low cost. In a further embodiment, motor 20 is able to achieve 45% efficiency at a relatively low cost.

Method of Assembly

Having described the construction of the electric motor 20, an exemplary embodiment method of assembly will now be described. Initially, the component parts of the motor will be made. The precise order of construction of these parts is not critical, and it will be understood that some or all of the parts may be made a remote location, and shipped to the final assembly site. The rotor 24 is formed by placing the magnet 35 and the rotor shaft 32, having the insert 34 at one end, in a mold. The hub 28 and fan blades 30 are molded around the magnet 35 and rotor shaft 32 such that they are held securely on the hub. The printed circuit board 40 is formed in a conventional manner by connection of the components 42 to the board. In the preferred embodiment, the programming contacts 82 and the power contacts 74 are shot into the circuit board 40, rather than being mounted by soldering (FIG. 2). The Hall device 46 is mounted on the finger 44 extending from the board and electrically connected to components 42 on the board.

The stator 22 includes several component parts which are formed prior to a stator assembly. The flux tube 48 (FIG. 1) is formed by press fitting bronze bearing 50 into steel tube 49. The bearing 50 is then impregnated with lubricant sufficient to last the lifetime of the motor 20. The stator core 92 (or bobbin) is molded and wound with magnet wire and terminated to form the winding 94 on the stator core. The pole pieces 100 are formed by stamping multiple, thin laminations 106, 108, 110, and 112 from a web of steel, and bending the pole pieces at substantially right angles to lamination body 114. In one embodiment, the laminations are made in two different forms, as described above. The laminations are stacked and coupled together to form each pole piece 100.

The component parts of the stator 22 are assembled in a press fixture (not shown). The flux tube 48 is placed in the fixture in a required orientation and extend through the central opening 120 of the stator core 92. The wound stator core 92 is set into the fixture generally on top of the pole pieces previously placed in the fixture. The other four pole pieces 100 are placed in the fixture above the stator core 92, but in the same angular position they will assume relative to the stator core when assembly is complete. The pole pieces 100 above the stator core 92 open downwardly and are positioned at locations which are 45° offset from the positions of the pole pieces at the bottom of the fixture.

The press fixture is closed and activated to push the pole pieces 100 onto the stator core 92. The radial location of the pole pieces 100 must be closely controlled so as to keep the air gap between the pole pieces and the rotor magnet 35 as small as possible without mechanical interference of the stator 22 and rotor 24. Magnet 35 can have various design embodiments to vary the air gap between the rotor and the stator. The various design embodiments of magnet 35 allow the rotor to park in a favorable position for starting as a result of the torque produced by the non-uniformity of the air gap.

The assembled stator core 92, pole pieces 100, and flux tube 48 are placed in a mold and substantially encapsulated in a suitable fire resistant thermoplastic. In some applications, the mold material may not have to be fire resistant. The ends of the bearing 50 are covered in the molding process and remain free of the encapsulating material. The terminal pins 98 (not shown) for making electrical connection with the winding 94 are also not completely covered by the encapsulating material (see FIG. 2). The skirt 70 and legs 36 are formed out of the same material which encapsulates the remainder of the stator. The legs 36 are preferably relatively long, constituting approximately one third of the length of the finished, encapsulated stator. Their length permits the legs 36 to be made thicker for a more robust construction, while permitting the necessary resilient bending needed for snap connection to the housing 26. In addition to the legs 36 and skirt 70, two positioning tangs (not shown) are formed which project axially in the same direction as the legs and require the stator 22 to be in a particular angular orientation relative to the housing 26 when the connection is made. Still further, printed circuit board supports are formed.

The encapsulated stator 22 is then assembled with the rotor 24 to form the stator/rotor subassembly. A thrust washer (not shown) is put on the rotor shaft 32 and slid down to the fixed end of the rotor shaft in the hub 28. The thrust washer has a rubber-type material on one side capable of absorbing vibrations, and a low friction material on the other side to facilitate a sliding engagement with the stator 22. The low friction material side of the thrust washer faces axially outwardly toward the open end of the hub 28. The stator 22 is then dropped into the hub 28, with the rotor shaft 32 being received through the bearing 50 at the center of the stator. One end of the bearing 50 engages the low friction side of the thrust washer so that the hub 28 can rotate freely with respect to the bearing. Another thrust washer (not shown) is placed on the free end of the bearing 50 and E clip 52 (FIG. 2) is shaped onto the end of the rotor shaft 32 so that the shaft cannot pass back through the bearing. Thus, the rotor 24 is securely mounted on the stator 22.

The printed circuit board 40 is secured to the stator/rotor subassembly. The printed circuit board 40 is pushed between the three legs 36 of the stator 22. The finger 44 of the circuit board 40 is received in an opening formed in the encapsulation so that the Hall device 46 on the end of the finger is positioned within the encapsulation next to the unbalanced pole piece 100, which was made without one side portion so that space would be provided for the Hall device. The side of the circuit board 40 nearest the stator 22 engages blocks and posts which hold the circuit board at a predetermined spaced position from the stator. The terminal pins 98 projecting from the stator 22 are received through two openings in the circuit board 40. The terminal pins 98 are electrically connected to the components 42 circuit board in a suitable manner, such as by soldering. The connection of the terminal pins 98 to the board 40 is the only fixed connection of the printed circuit board to the stator 22.

The stator/rotor subassembly and the printed circuit board 40 are then connected to the housing 26 to complete the assembly of the motor. The motor 10 is now fully assembled, without the use of any fasteners, by snap together construction.

The printed circuit board 40 is secured in place by an interference fit with housing 26. As the stator/rotor assembly advances into housing 26, peripheral edges of the circuit board 40 engage the housing. In this way the printed circuit board 40 is secured in place without the use of any fasteners. The angular orientation of the printed circuit board 40 is set by its connection to the terminal pins 98 from the stator 22. The programming contacts 82 are thus aligned with the port 84 (FIG. 6) and the power contacts 74 are aligned with the plug receptacle 76 in housing 26. It is also envisioned that the printed circuit board 40 may be secured to the stator 22 without any interference fit with housing 26. For instance, a post (not shown) formed on the stator 22 may extend through the circuit board and receive a push nut thereon against the circuit board to fix the circuit board on the stator.

In an exemplary embodiment, the motor 20 has not been programmed or tested prior to the final assembly of the motor. Following assembly, a ganged connector (not shown, but essentially a probe 88 and a power plug 78) is connected to the printed circuit board 44 through the port and plug receptacle 76. The motor is then programmed, such as by setting the speed and the start delay, and tested. If the circuit board 40 is found to be defective, it is possible to non-destructively disassemble the motor and replace the circuit board without discarding other parts of the motor. This can be done be inserting a tool (not shown) into the openings 66 in the closed end of the housing 26 and prying the catches 38 off the shoulders 64. If the motor passes the quality assurance tests, the stop 86 is placed in the port 84 and the motor is prepared for shipping.

It is possible with the motor of the present invention, to re-program the motor 20 after it has been shipped from the motor assembly site. The end user, such as a refrigerated case manufacturer, can remove the stop 86 from the port 84 and connect the probe 88 to the programming contacts 82 through the port. The motor can be re-programmed as needed to accommodate changes made by the end user in operating specifications for the motor.

Figure 14:
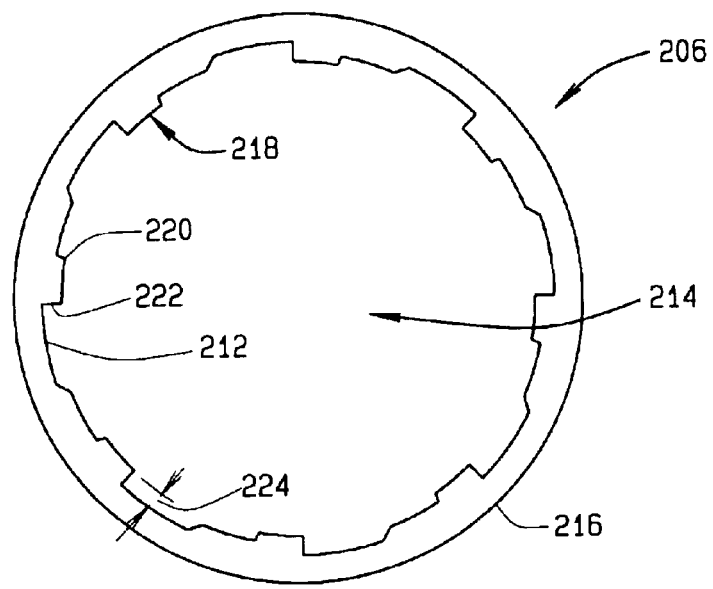
FIG. 14 is a plan view of one embodiment of a magnet used within the electric motor shown in FIG. 1.

The motor 20 can be installed, such as in a refrigerated 10 case, by inserting fasteners (not shown) through the housing 26 and into the case. Thus, the housing 26 is capable of supporting the entire motor. The motor is connected to a power source by plugging the plug into the plug receptacle 76 (FIG. 14). Prior to engaging the printed circuit board 40, the plug engages the locating tabs 80 in the plug receptacle 76 so that in its fully inserted position, the plug is spaced from the printed circuit board. As a result, the power contacts 74 are inserted far enough into the plug to make electrical connection, but are not fully received in the plug. Therefore, although ice can form on the power contacts 74 in the refrigerated case environment, it will not build up between the plug and the circuit board 40 causing disconnection and/or damage.

Figure 19:
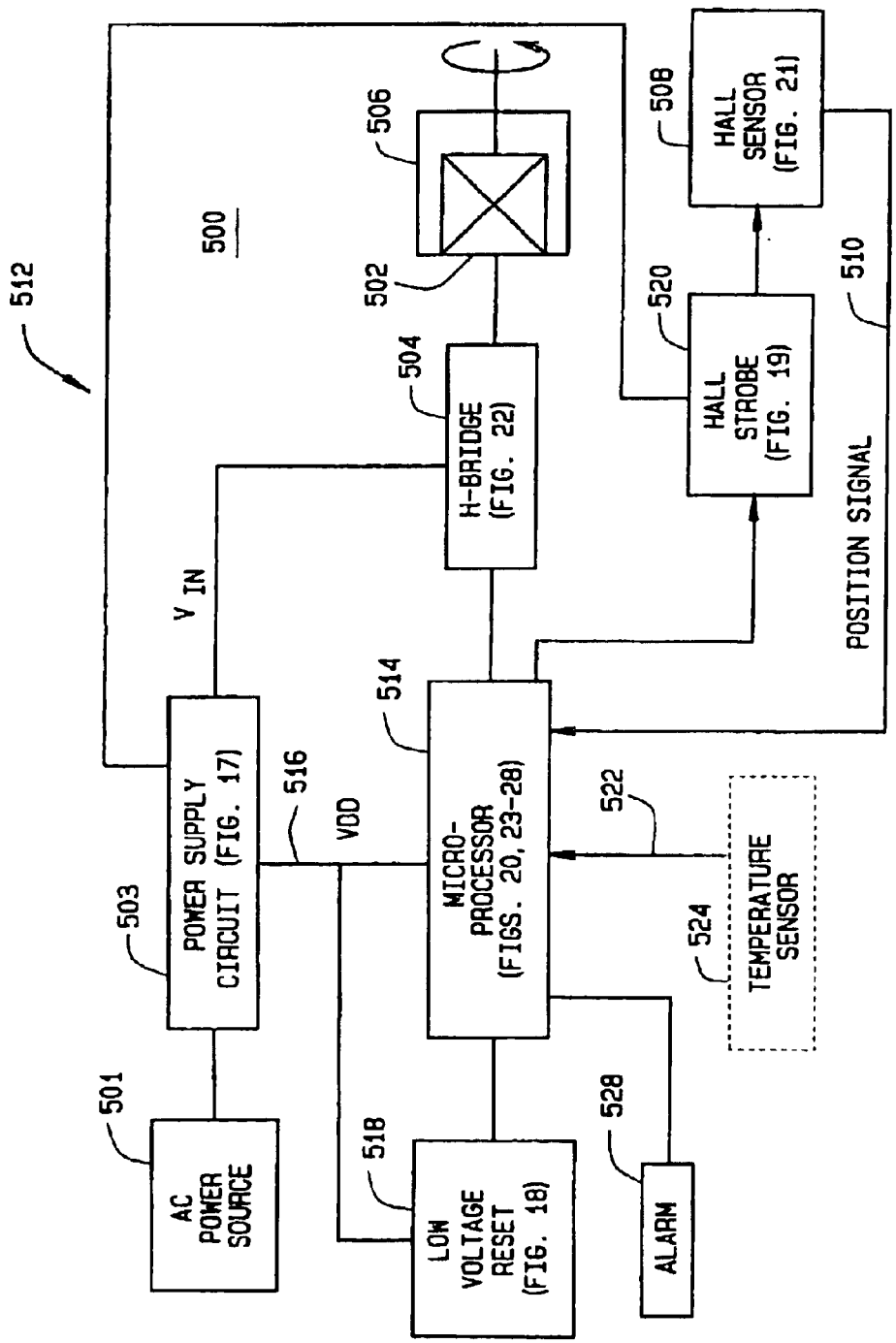
FIG. 19 is a block diagram of the microprocessor controlled single phase motor according to the invention.

FIG. 19 is a block diagram of the microprocessor controlled single phase motor 500 according to the invention. The motor 500 is powered by an AC power source 501. The motor 500 includes a stator 502 having a single phase winding. The direct current power from the source 501 is supplied to a power switching circuit via a power supply circuit 503. The power switching circuit may be any circuit for commutating the stator 502 by using an H-bridge 504 having power switches for selectively connecting the AC power source 501 to the single phase winding of the stator 502. A permanent magnet rotor 506 is in magnetic coupling relation to the stator and is rotated by the commutation of the winding and the magnetic field created thereby. Preferably, the motor is an inside-out motor in which the stator is interior to the rotor and the exterior rotor rotates about the interior stator. However, it is also contemplated that the rotor may be located within and internal to an external stator.

A position sensor such as a hall sensor 508 is positioned on the stator 502 for detecting the position of the rotor 506 relative to the winding and for providing a position signal via line 510 indicating the detected position of the rotor 506. Reference character 512 generally refers to a control circuit including a microprocessor 514 responsive to and receiving the position signal via line 510. The microprocessor 514 is connected to the H-bridge 504 for selectively commutating the power switches thereof to commutate the single phase winding of the stator 502 as a function of the position signal.

Voltage VDD to the microprocessor 514 is provided via line 516 from the power supply circuit 503. A low voltage reset circuit 518 monitors the voltage VDD on line 516 and applied to the microprocessor 514. The reset circuit 518 selectively resets the microprocessor 514 when the voltage VDD applied to the microprocessor via line 516 transitions from below a predetermined threshold to above the predetermined threshold. The threshold is generally the minimum voltage required by the microprocessor 514 to operate. Therefore, the purpose of the reset circuit 518 is to maintain operation and re-establish operation of the microprocessor in the event that the voltage VDD supplied via line 516 drops below the preset minimum required by the microprocessor 514 to operate.

Optionally, to save power, the hall sensor 508 may be intermittently powered by a hall strobe 520 controlled by the microprocessor 514 to pulse width modulate the power applied to the hall sensor.

The microprocessor 514 has a control input 522 for receiving a signal which affects the control of the motor 500. For example, the signal may be a speed select signal in the event that the microprocessor is programmed to operate the rotor such that the stator is commutated at two or more discrete speeds. Alternatively, the motor may be controlled at continuously varying speeds or torques according to temperature. For example, in place of or in addition to the hall sensor 508, an optional temperature sensor 524 may be provided to sense the temperature of the ambient air about the motor. This embodiment is particularly useful when the rotor 506 drives a fan which moves air through a condenser for removing condenser generated heat or which moves air through an evaporator for cooling.

In one embodiment, the processor interval clock corresponds to a temperature of the air moving about the motor and for providing a temperature signal indicating the detected temperature. For condenser applications where the fan is blowing air into the condenser, the temperature represents the ambient temperature and the speed (air flow) is adjusted to provide the minimum needed air flow at the measured temperature to optimize the heat transfer process. When the fan is pulling air over the condenser, the temperature represents ambient temperature plus the change in temperature (t) added by the heat removed from the condenser by the air stream. In this case, the motor speed is increased in response to the higher combined temperature (speed is increased by increasing motor torque, i.e., reducing the power device off time PDOFFTIM; see FIG. 29). Additionally, the speed the motor could be set for different temperature bands to give different air flow which would be distinct constant air flows in a given fan static pressure condition. Likewise, in a condenser application, the torque required to run the motor at the desired speed represents the static load on the motor. The higher static loads can be caused by installation in a restricted environment, i.e., a refrigerator installed as a built-in, or because the condenser air flow becomes restricted due to dust build up or debris. Both of these conditions may warrant an increased air flow/speed.

Similarly, in evaporator applications, the increased static pressure could indicate evaporator icing or increased packing density for the items being cooled.

In one of the commercial refrigeration applications, the evaporator fan pulls the air from the air curtain and from the exit air cooling the food. This exhaust of the fan is blown through the evaporator. The inlet air temperature represents air curtains and food exit air temperature. The fan speed would be adjusted appropriately to maintain the desired temperature.

Alternatively, the microprocessor 514 may commutate the switches at a variable speed rate to maintain a substantially constant air flow rate of the air being moved by the fan connected to the rotor 506. In this case, the microprocessor 514 provides an alarm signal by activating alarm 528 when the motor speed is greater than a desired speed corresponding to the constant air flow rate at which the motor is operating. As with the desired torque, the desired speed may be determined by the microprocessor as a function of an initial static load of the motor and changes in static load over time.

Figure 26:
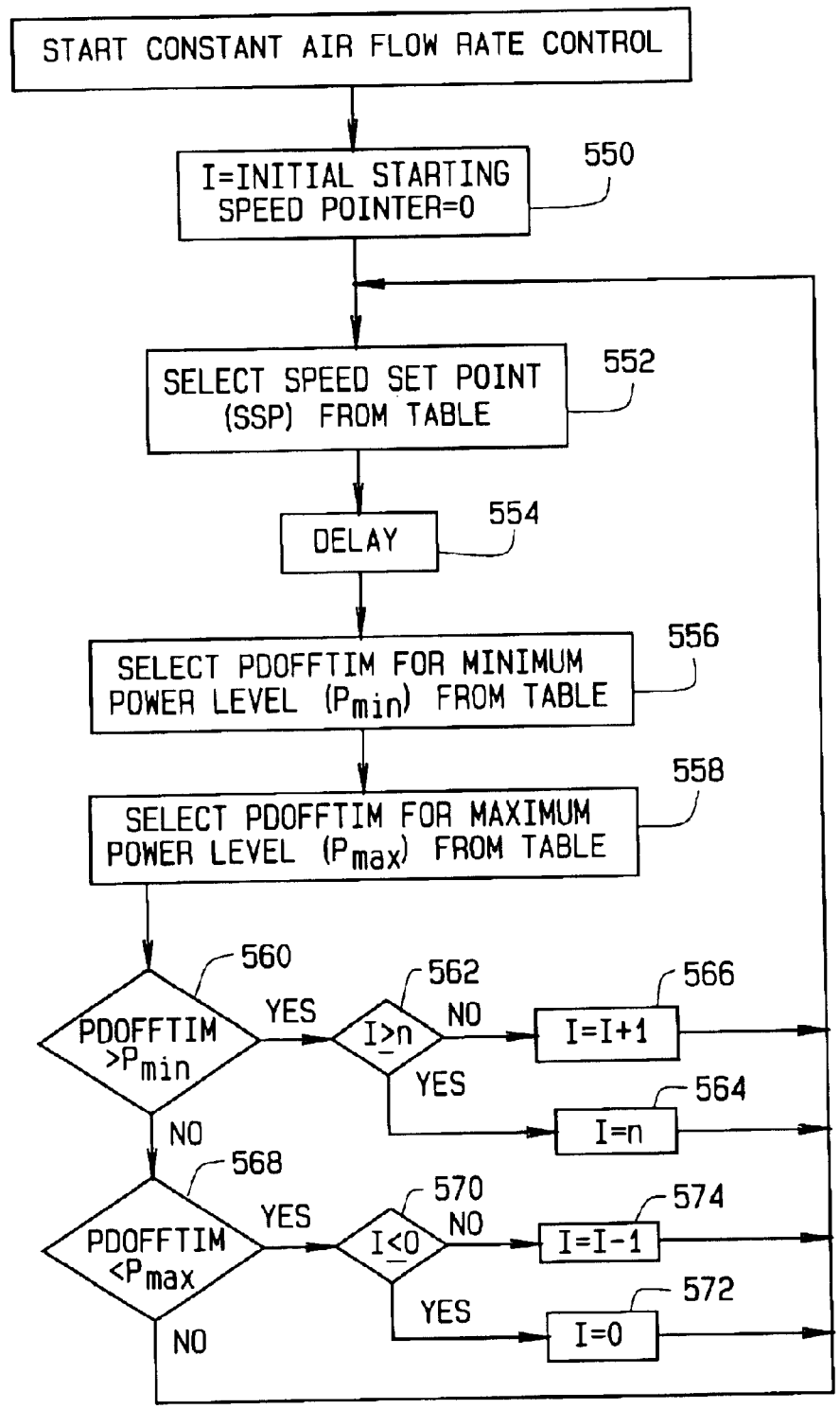
FIG. 26 is a flow diagram illustrating the operation of the microprocessor of the motor of the invention in a mode in which the motor is commutated at a constant air flow rate at a speed and torque which are defined by tables which exclude resonant points.

FIG. 26 illustrates one exemplary embodiment of the invention in which the microprocessor 514 is programmed according to the flow diagram therein. In particular, the flow diagram of FIG. 26 illustrates a mode in which the motor is commutated at a constant air flow rate corresponding to a speed and torque which are defined by tables which exclude resonant points. For example, when the rotor is driving a fan for moving air over a condenser, the motor will have certain speeds at which a resonance will occur causing increased vibration and/or increased audio noise. Speeds at which such vibration and/or noise occur are usually the same or similar and are predictable, particularly when the motor and its associated fan are manufactured to fairly close tolerances. Therefore, the vibration and noise can be minimized by programming the microprocessor to avoid operating at certain speeds or within certain ranges of speeds in which the vibration or noise occurs. As illustrated in FIG. 26, the microprocessor 514 would operate in the following manner. After starting, the microprocessor sets the target variable I to correspond to an initial starting speed pointer defining a constant air flow rate at step 550. For example, I=0. Next, the microprocessor proceeds to step 552 and selects a speed set point (SSP) from a table which correlates each of the variable levels 0 to n to a corresponding speed set point (SSP), to a corresponding power device off time (PDOFFTIM=$P_{min}$) for minimum power and to a corresponding power device off time (PDOFFTIM=$P_{max}$) for maximum power.

It is noted that as the PDOFFTIM increases, the motor power decreases since the controlled power switches are off for longer periods during each commutation interval. Therefore, the flow chart of FIG. 26 is specific to this approach. Others skilled in the art will recognize other equivalent techniques for controlling motor power.

After a delay at step 554 to allow the motor to stabilize, the microprocessor 514 selects a PDOFFTIM for a minimum power level ($P_{min}$) from the table which provides current control by correlating a minimum power level to the selected level of variable I. At step 558 the microprocessor selects a PDOFFTIM for a maximum power level ($P_{max}$) from the table which provides current control by correlating a maximum power level to the selected variable level I.

At step 560, the microprocessor compares the actual PDOFFTIM representing the actual power level to the minimum PDOFFTIM ($P_{min}$) for this I. If the actual PDOFFTIM is greater than the minimum PDOFFTIM (PDOFFTIM>$P_{min}$), the microprocessor proceeds to step 562 and compares the variable level I to a maximum value n. If I is greater or equal to n, the microprocessor proceeds to step 564 to set I equal to n. Otherwise, I must be less than the maximum value for I so the microprocessor 514 proceeds to step 566 to increase I by one step.

If, at step 560, the microprocessor 514 determines that the actual PDOFFTIM is less than or equal to the minimum PDOFFTIM (PDOFFTIM $P_{min}$), the microprocessor proceeds to step 568 and compares the actual PDOFFTIM representing the actual power level to the maximum PDOFFTIM ($P_{max}$) for this I. If the actual PDOFFTIM is less than the maximum PDOFFTIM (PDOFFTIM<$P_{max}$), the microprocessor proceeds to step 570 and compares the variable level I to a minimum value 0. If I is less or equal to 0, the microprocessor proceeds to step 572 to set I equal to 0. Otherwise, I must be greater than the minimum value for I so the microprocessor 514 proceeds to step 574 to decrease I by one step.

If the actual PDOFFTIM is less than or equal to the minimum and is greater than or equal to the maximum so that the answer to both steps 560 and 568 is no, the motor is operating at the speed and power needed to provide the desired air flow so the microprocessor returns to step 552 to maintain its operation.

Alternatively, the microprocessor 514 may be programmed with an algorithm which defines the variable rate at which the switches are commutated. This variable rate may vary continuously between a preset range of at least a minimum speed $S_{min}$ and not more than a maximum speed $S_{max}$, except that a predefined range of speeds S1+/−S2 is excluded from the preset range. As a result, for speeds between S1−S2 and S1, the microprocessor operates the motor at S1−S2 and for speeds between S1 and S1+S2, the microprocessor operates the motor at speeds S1+S2.

Figure 25:
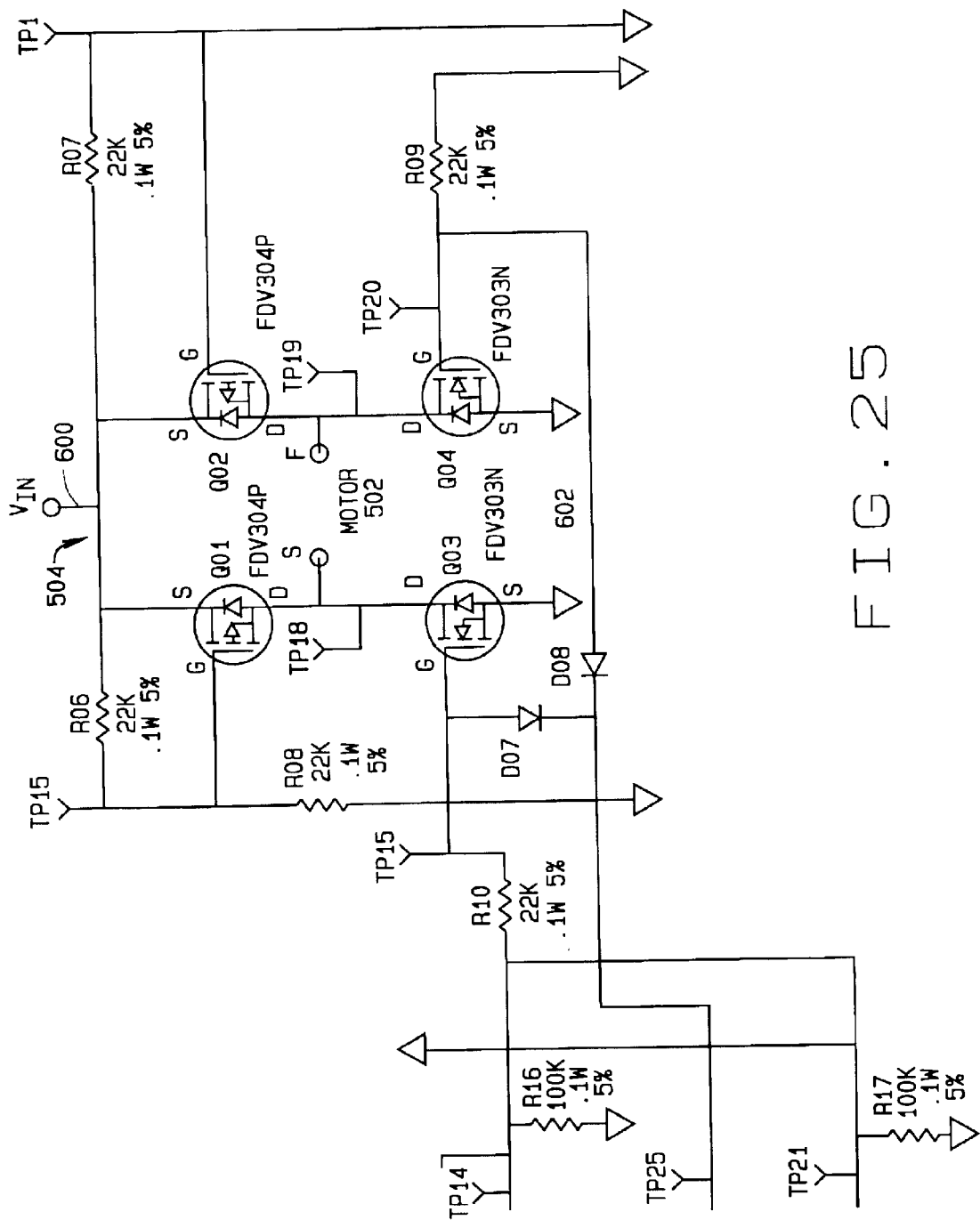
FIG. 25 is a schematic diagram of the H-bridge array of witches for commutating the stator of the motor of FIG. 19 according to the invention.

FIG. 25 is a schematic diagram of the H-bridge 504 which constitutes the power switching circuit having power switches according to the invention, although other configurations may be used, such as two windings which are single ended or the H-bridge configuration of U.S. Pat. No. 5,859, 519, incorporated by reference herein. The dc input voltage is provided via a rail 600 to input switches Q1 and Q2. An output switch Q3 completes one circuit by selectively connecting switch Q2 and stator 502 to a ground rail 602. An output switch Q4 completes another circuit by selectively connecting switch Q1 and motor 502 to the ground rail 602. Diodes D7 and D8 are configured to allow switches Q1, Q2, Q3, and Q4 to be off at the same time.

Figure 30:
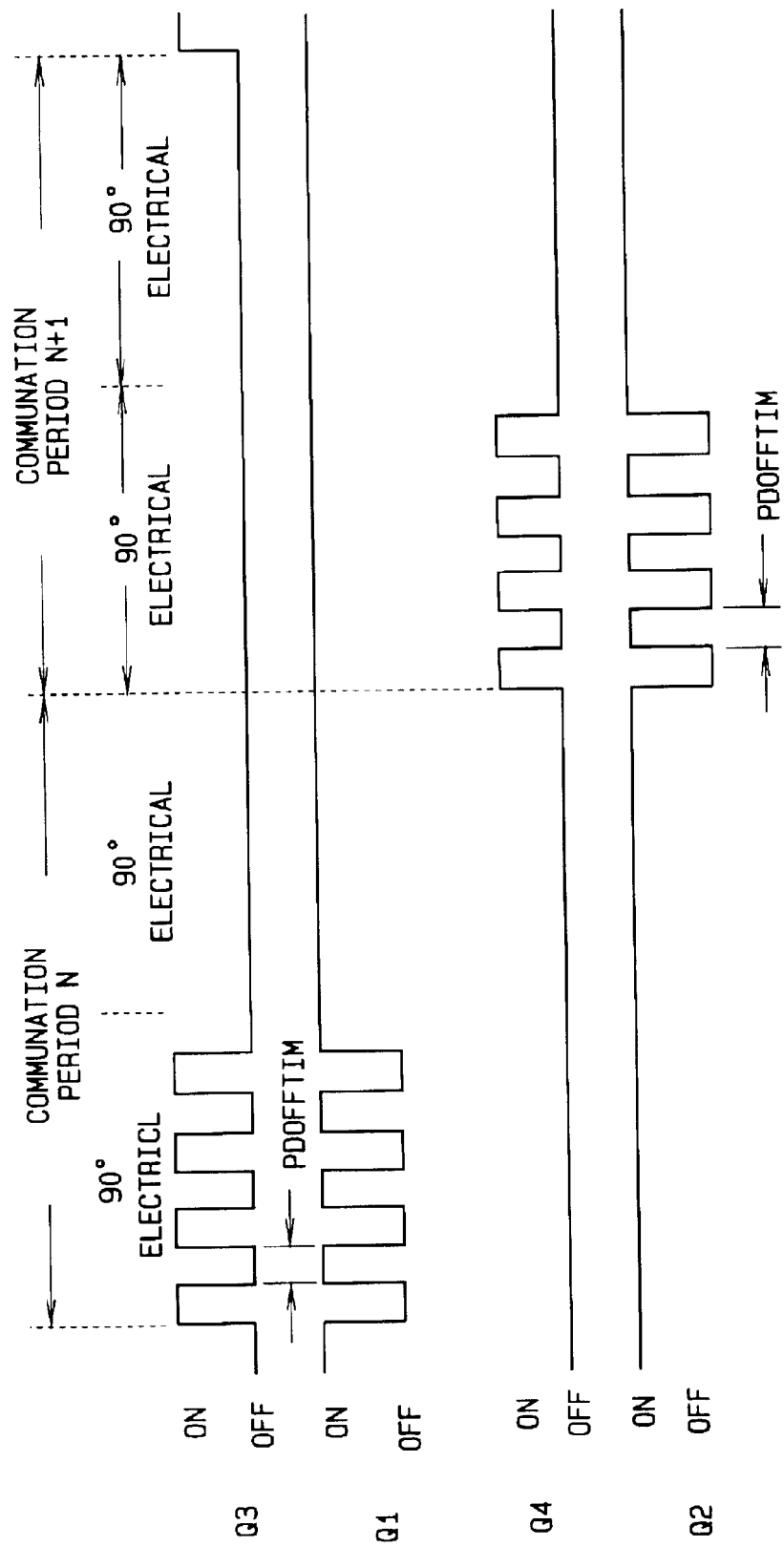
FIG. 30 is a timing diagram illustrating the run up mode which provides a safe operating area (SQA) control based on speed.

The single phase winding of the stator 502 has a first terminal F and a second terminal S. As a result, switch Q1 constitutes a first input switch connected between terminal S and the power supply provided via rail 600. Switch Q3 constitutes a first output switch connected between terminal S and the ground rail 602. Switch Q2 constitutes a second input switch connected between the terminal F and the power supply provided via rail 600. Switch Q4 constitutes a second output switch connected between terminal F and ground rail 602. As a result, the microprocessor controls the first input switch Q1 and the second input switch Q2 and the first output switch Q3 and the second output switch Q4 such that the current through the motion is provided during the first 90° of the commutation period illustrated in FIG. 30. PDOFFTIM is the term used in the software power control algorithms. When the first output switch Q3 is open, the first input switch Q1 is closed. Similarly, the second input switch Q2 is connected to and responsive to the second output switch Q4 so that when the second output switch Q4 is closed, the second input switch Q2 is open. Also, when the second output switch Q4 is open, the second input switch Q2 is closed. This is illustrated in FIG. 30 wherein it is shown that the status of Q1 is opposite the status of Q3 and the status of Q2 is opposite the status of Q4 at any instant in time.

Figure 29:
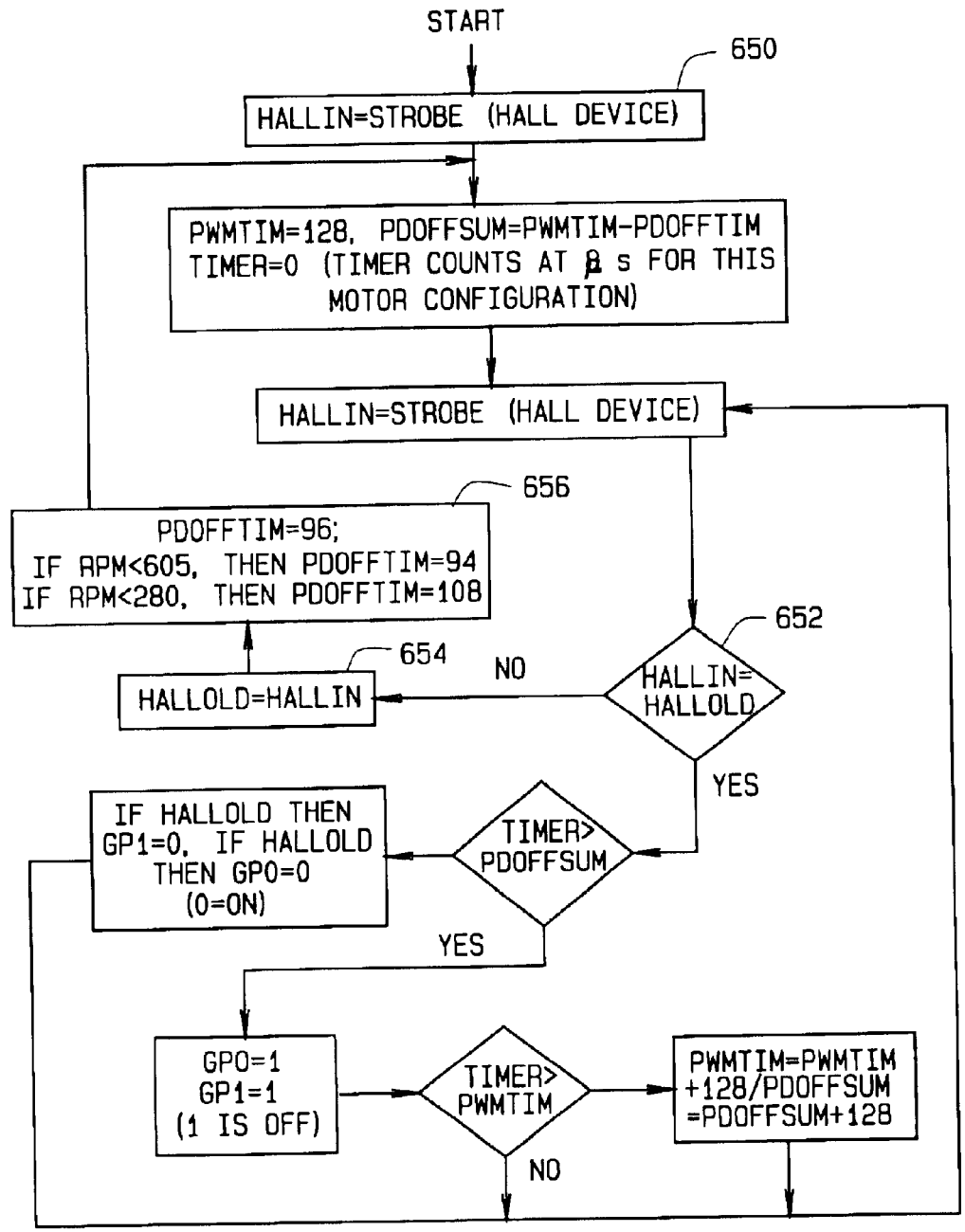
FIG. 29 is a flow chart of one preferred embodiment of implementation of the timing diagram of FIG. 28 illustrating the start up mode which provides a safe operating area (SQA) control based on speed.

FIG. 29 is a timing flow chart illustrating the start up mode with a current maximum determined by the setting of PDOFFTIM versus the motor speed. In this mode, the power devices are pulse width modulated by software in a continuous mode to get the motor started. The present start algorithm stays in the start mode eight commutations and then goes into the RUN mode. A similar algorithm could approximate constant acceleration by selecting the correct settings for PDOFFTIM versus speed. At step 650, the value HALLIN is a constant defining the starting value of the Hall device reading. When the actual Hall device reading (HALLOLD) changes at step 652, HALLIN is set to equal HALLOLD at step 654 and the PDOFFTIM is changed at step 656 depending on the RPMs.

Figure 28:
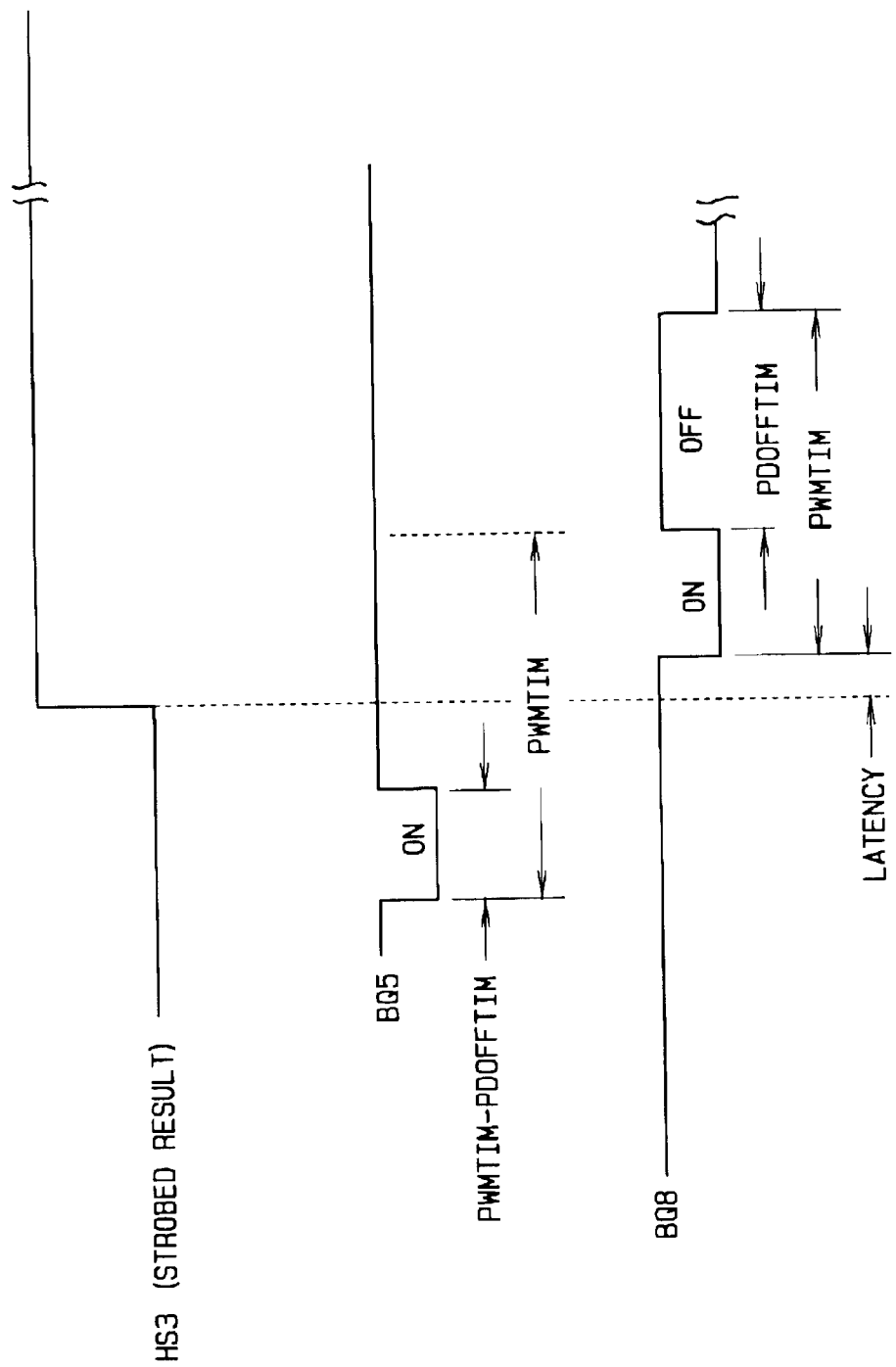
FIG. 28 is a timing diagram illustrating the start up mode which provides a safe operating area (SQA) control based on speed.

FIG. 28 illustrates the microprocessor outputs (BQ5 and BQ8) that control the motor when the strobed hall effect output (HS3) changes state. In this example, BQS is being pulse width modulated while HS3 is 0. When HS3 (strobed) changes to a 1, there is a finite period of time (LATENCY) for the microprocessor to recognize the magnetic change after which BQ5 is in the off state so that BQ8 begins to pulse width modulate (during PWNTIM).

Figure 27:
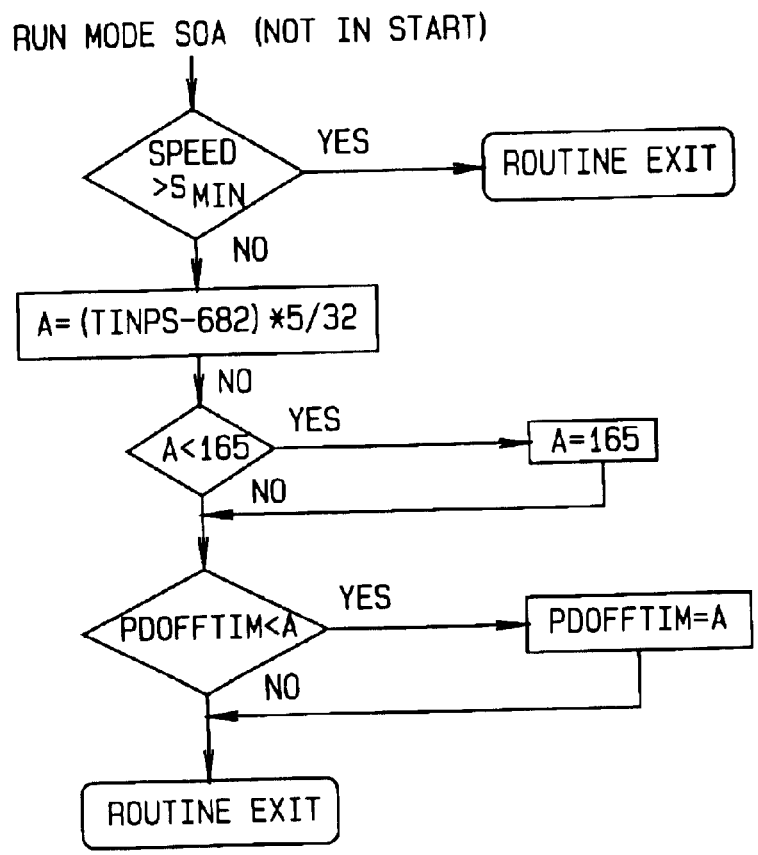
FIG. 27 is a flow diagram illustrating operation of the microprocessor of the motor of the invention in a run mode (after start) in which the safe operating area of the motor is maintained without current sensing by having a minimum off time for each power switch, the minimum off time depending on the speed of the rotor.

FIG. 27 illustrates another alternative aspect of the invention wherein the microprocessor operates within a run mode safe operating area without the need for current sensing. In particular, according to FIG. 27, microprocessor 514 controls the input switches Q1–Q4 such that each input switch is open or off for a minimum period of time (PDOFFTIM) during each pulse width modulation period whereby over temperature protection is provided without current sensing. Specifically, the minimum period may be a function of the speed of the rotor whereby over temperature protection is provided without current sensing by limiting the total current over time. As illustrated in FIG. 27, if the speed is greater than a minimum value (i.e., if A<165), A is set to 165 and SQA limiting is bypassed and not required; if the speed is less than (or equal to) a minimum value (i.e., if A 165), the routine of FIG. 27 ensures that the switches are off for a minimum period of time to limit current. "A" is a variable and is calculated by an equation that represents a PDOFFTIM minimum value at a given speed (speed is a constant multiplied by 1/TINPS, where TINPS is the motor period). Then, if PDOFFTIM is<A, PDOFFTIM is set to A so that the motor current is kept to a maximum desired value at the speed the motor is running.

Figure 21:
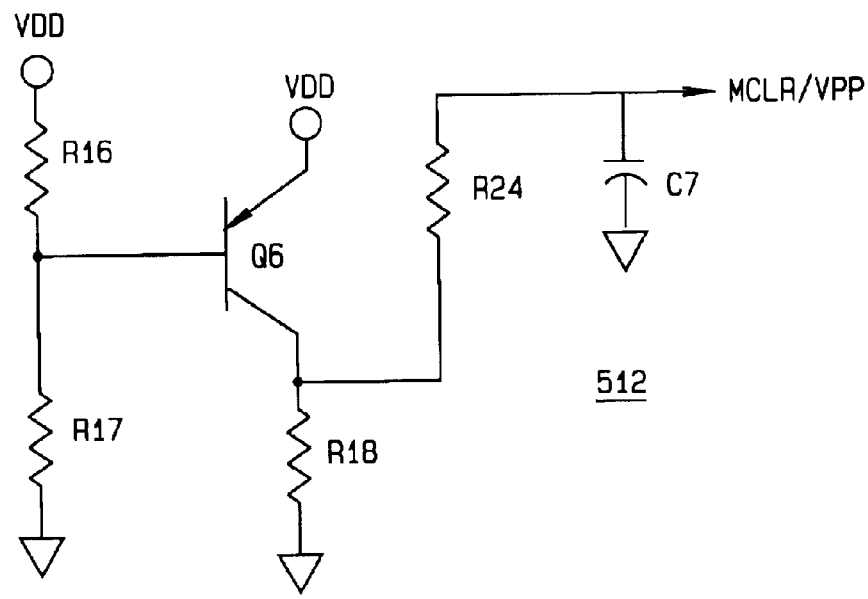
FIG. 21 is a schematic diagram of the low voltage reset for the microprocessor of the motor of FIG. 19 according to the invention.

As illustrated in FIG. 21, the motor includes a reset circuit 512 for selectively resetting the microprocessor when a voltage of the power supply vdd transitions from below a predetermined threshold to above a predetermined threshold. In particular, switch Q6 disables the microprocessor via port MCLR/VPP when the divided voltage between resistors R16 and R17 falls below a predetermined threshold. The microprocessor is reactivated and reset when the voltage returns to be above the predetermined threshold thereby causing switch Q6 to close.

Figure 22:
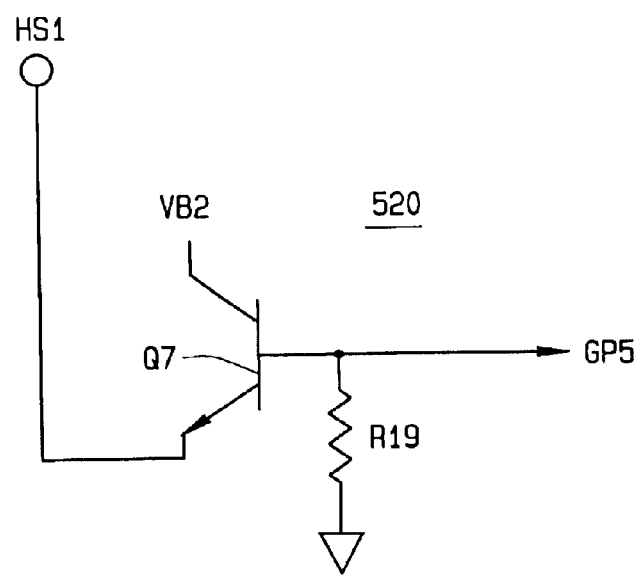
FIG. 22 is a schematic diagram of the strobe for the Hall sensor of the motor of FIG. 19 according to the invention.

FIG. 22 illustrates an exemplary embodiment of a strobe circuit 520 for the hail sensor 508. The microprocessor generates a pulse width modulated signal GP5 which intermittently powers the hall sensor 508 as shown in FIG. 21 by intermittently closing switch Q7 and providing voltage VB2 to the hail sensor 508 via line HS1.

Figure 20:
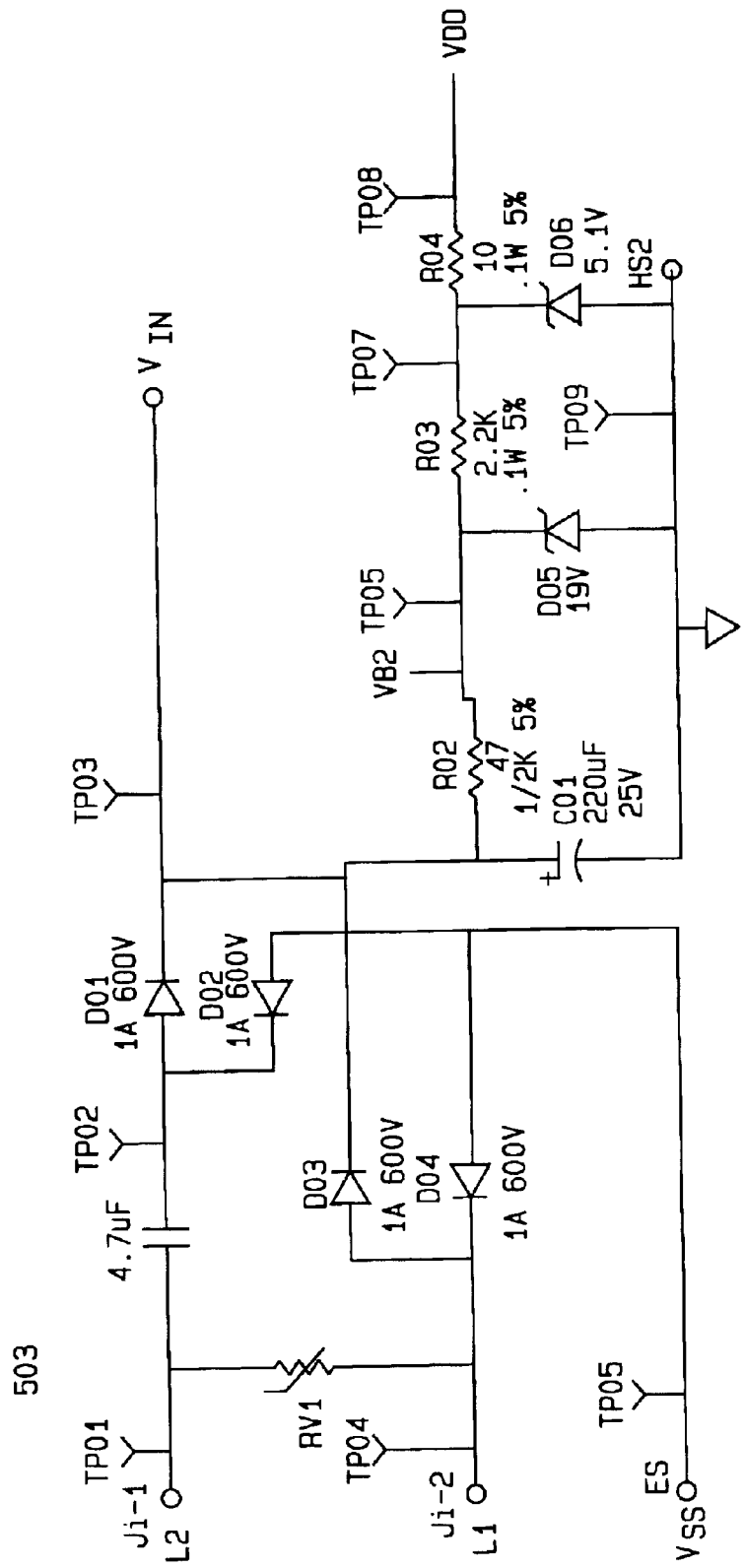
FIG. 20 is a schematic diagram of the power supply of the motor of FIG. 16 according to the invention. Alternatively, the power supply circuit could be modified for a DC input or for a non-doubling AC input.

FIG. 20 is a schematic diagram of the power supply circuit 503 which supplies the voltage $V_{in}$ for energizing the stator single phase winding via the H-bridge 504 and which also supplies various other voltages for controlling the H-bridge 504 and for driving the microprocessor 514. In particular, the lower driving voltages including VDD for driving the microprocessor, HS2 for driving the hall sensor 508, and VSS which is the control circuit reference ground not necessarily referenced to the input AC or DC voltage are supplied from the input voltage $V_{in}$ via a lossless inline series capacitor C1. The voltage across capacitor C1 is maintained at no greater than 25 volts, and the output includes a 47 ohm resistor R2 and a 19 volt diode D5. FIG. 20 also shows a diode bridge including D1, D2, D3, and D4.

Figure 23:
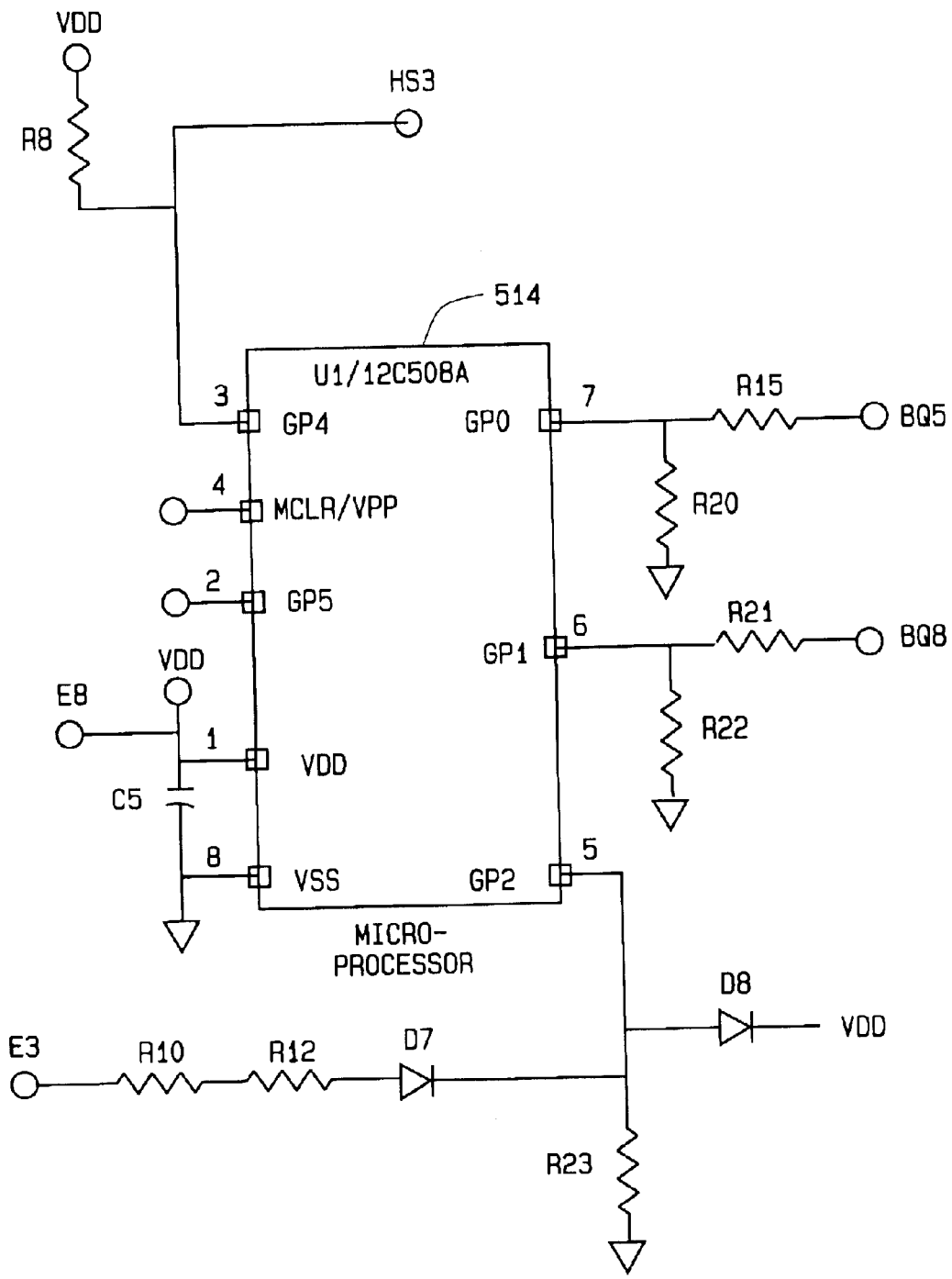
FIG. 23 is a schematic diagram of the microprocessor of the motor of FIG. 19 according to the invention.
Figure 24:
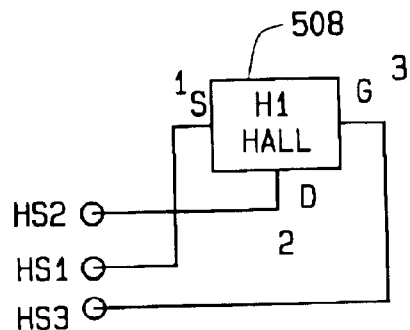
FIG. 24 is a schematic diagram of the Hall sensor of the motor of FIG. 19 according to the invention.

FIG. 23 illustrates the inputs and outputs of microprocessor 514. In particular, only a single input GP4 from the position sensor is used to provide information which controls the status of control signal BQ5 applied to switch Q5 to control output switch Q3 and input switch Q1 and which controls the status of control signal BQ8 applied to switch Q8 to control output switch Q4 and input switch Q2. Input GP2 is an optional input for selecting motor speed or other feature or may be connected for receiving a temperature input comparator output when used in combination with thermistor 524.

Figure 31:
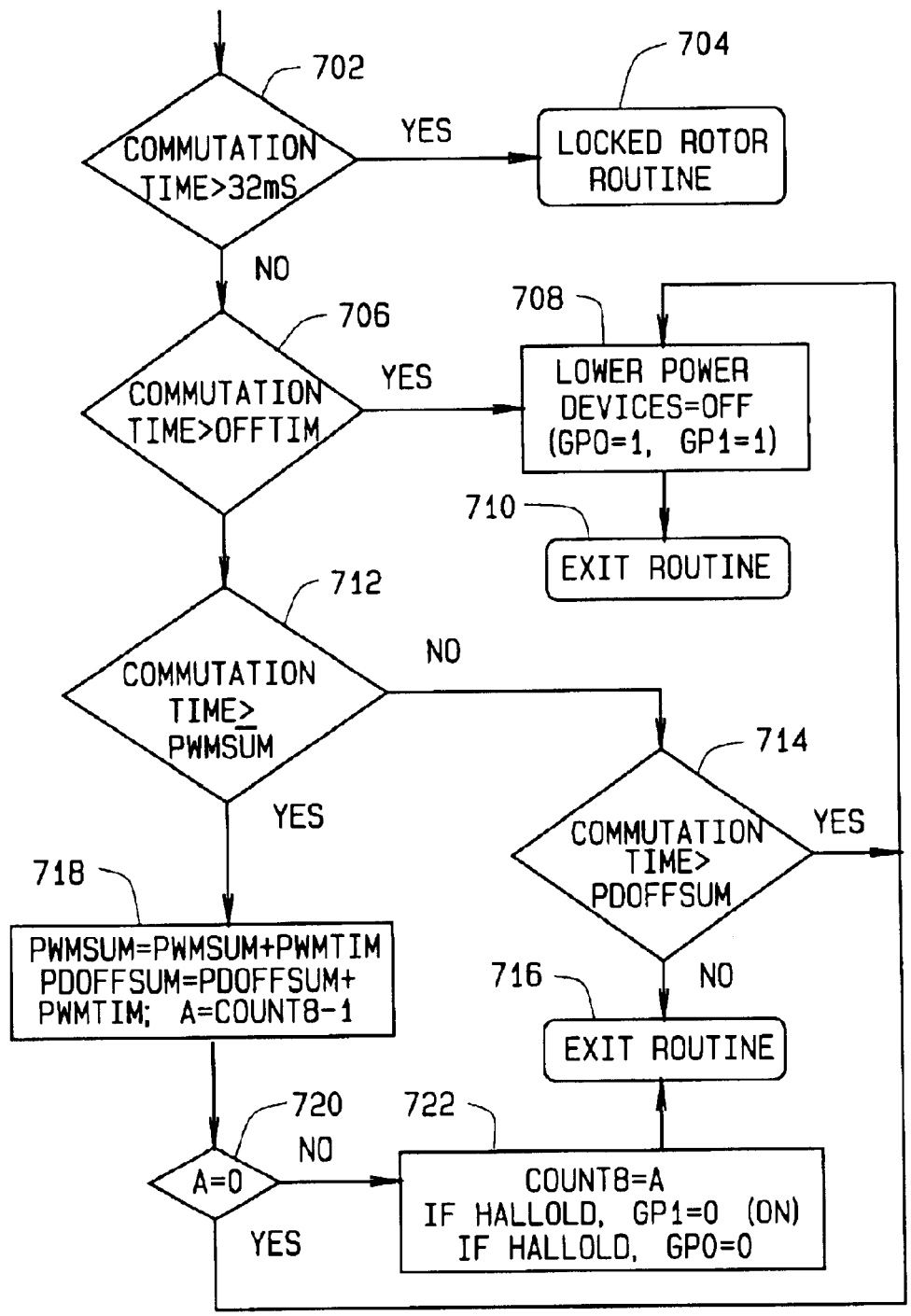
FIG. 31 is a flow diagram illustrating the operation of the microprocessor of the motor of the invention in a run mode started after a preset number of commutations in the start up mode wherein in the run mode the microprocessor commutates the switches for N commutations at a constant commutation period and wherein the commutation period is adjusted every M commutations as a function of the speed, the torque or the constant air flow rate of the rotor.

FIG. 31 illustrates a flow chart of one preferred embodiment of a run mode in which the power devices are current controlled. In this mode, the following operating parameters apply:

Motor Run Power Device (Current) Control

At the end of each commutation, the time power devices will be off the next time the commutation period is calculated.

OFFTIM=TINP/2. (The commutation period divided by 2 =90°). While in the start routine, this is also calculated.

After eight commutations (1 motor revolution) and at the start routine exit, PWMTIM is calculated:

*PWMTIM=OFFTIM/4*

At the beginning of each commutation period, a counter (COUNT8) is set to five to allow for four times the power devices will be turned on during this commutation:

*PWMSUM=PWMTIM*

*PDOFFSUM=PWNTIM−PDOFFTIM*

TIMER=0

(PDOFFTIM is used to control the amount of current in the motor and is adjusted in the control algorithm (SPEED, TORQUE, CFM, etc.).

Commutation time set to 0 at each strobed hall change, HALLOLD is the saved hall strobe value.

During motor run, the flow chart of FIG. 31 is executed during each commutation period. In particular at step 702, the commutation time is first checked to see if the motor has been in this motor position for too long a period of time, in this case 32 mS. If it has, a locked rotor is indicated and the program goes to the locked rotor routine at step 704. Otherwise, the program checks to see if the commutation time is greater than OFFTIM at step 706; if it is, the commutation period is greater than 90 electrical degrees and the program branches to step 708 which turns the lower power devices off and exits the routine at step 710. Next, the commutation time is compared at step 712 to PWMSUM. If it is less than PWMSUM, the commutation time is checked at step 714 to see if it is less or equal to PDOFFSUM where if true, the routine is exited at step 716; otherwise the routine branches to step 708 (if step 714 is yes).

For the other case where the commutation time is greater or equal to PWMSUM, at step 718 PWMSUM and PDOFFSUM have PWMTIM added to them to prepare for the next pulse width modulation period and a variable A is set to COUNT 8-1.

If A is equal to zero at step 720, the pulse width modulations (4 pulses) for this commutation period are complete and the program branches to step 708 to turn the lower power devices off and exit this routine. If A is not equal to zero, COUNT8 (which is a variable defining the number of PWMs per commutation) is set to A at step 722; the appropriate lower power device is turned on; and this routine is exited at step 716. More PWM counts per commutation period can be implemented with a faster processor. Four (4) PWMs per commutation period are preferred for slower processors whereas eight (8) are preferred for faster processors.

An exemplary timing diagram is illustrated in FIG. 30. In the locked rotor routine of step 704, on entry, the lower power devices are turned off for 1.8 seconds after which a normal start attempt is tried.

While the invention has been described in terms of various specific embodiments, those skilled in the art will recognize that the invention can be practiced with modification within the spirit and scope of the claims.

What is claimed is:

1. An electric motor comprising:
   a stator including a stator core, a first and second lamination stack, a flux tube extending therethrough, and windings on said stator core;
   a rotor including a magnet and a hub having an inner surface, wherein a shaft is received in said stator core for rotation of said rotor relative to said stator about a longitudinal axis of said shaft, and at least one of an inner surface and an outer surface of said magnet of said rotor is a non-uniform surface configured to create a non-uniform air-gap between said rotor and said stator; and
   a housing adapted to support said stator and said rotor.

2. An electric motor in accordance with claim 1 wherein said rotor hub defining a cavity opening at one axial end of said hub and receiving a portion of said stator therein, said rotor shaft disposed at least partially within the cavity.

3. An electric motor in accordance with claim 1 wherein said magnet comprises a first end and a second end, said magnet inner surface defining a bore extending between said first end and said second end such that a portion of said stator and said rotor shaft extend into the magnet bore.

4. An electric motor in accordance with claim 3 wherein said magnet inner surface comprises a plurality of projections extending between said magnet first and second ends.

5. An electric motor in accordance with claim 3 wherein said magnet inner surface comprises a plurality of notches extending between said magnet first and second ends.

6. An electric motor in accordance with claim 3 wherein said magnet inner surface comprises a plurality of serrations extending between said magnet first and second ends.

7. An electric motor in accordance with claim 3 wherein said magnet inner surface comprises a plurality of skewed serrations extending between said magnet first and second ends.

8. An electric motor in accordance with claim 3 wherein said magnet outer surface comprises a plurality of serrations extending between said magnet first and second ends.

9. An electric motor in accordance with claim 1 wherein said stator core and winding are substantially encapsulated in a thermoplastic encapsulation material formed with a generally annular skirt projecting radially outwardly from said encapsulated stator core, said skirt in close proximity with said rotor to define an exterior rotor/stator junction, said skirt having a beveled edge for deflecting water away from said junction thereby to inhibit entry of water between said rotor and stator.

10. An electric motor in accordance with claim 1 further comprising a printed circuit board having an electrical connection to said winding and free of other connection to said stator, said printed circuit board having an interference fit with said housing and free of other connection to said housing.

11. An electric motor in accordance with claim 1 wherein said stator further comprises a flux tube extending through said first lamination stack, said stator core, and said second lamination stack, said flux tube comprising a bronze bearing press fitted therein, a central bore configured to receive said rotor shaft extending therethrough, and a slit extending axially along said flux tube.

12. An electric motor in accordance with claim 1 further comprising a printed circuit board having programmable components adapted to control the operation of said motor, said printed circuit board positioned in said housing and having electrical contacts thereon, said housing having a port formed therein and generally aligned with said contacts on said printed circuit board such that said contacts are accessible through said port for connection to a microprocessor.

13. An electric motor in accordance with claim 1 further comprising a printed circuit board electrically connected to said winding and disposed generally in said housing, said printed circuit board having a power contact mounted thereon for receiving electrical power for said winding, said housing formed with a plug receptacle for receiving a plug from an external electrical power source into connection with said power contact, said power contact positioned in said plug upon connection of said plug to said power contact, said housing including a plug locator for locating said plug relative to said power contact so that said contact is received only partially into said plug upon connection to said plug.

14. An electric motor in accordance with claim 1 wherein said motor comprises an efficiency between approximately 30% and 60%.

15. An electric motor in accordance with claim 1 wherein said motor comprises an efficiency between approximately 35% and 50%.

16. An electric motor in accordance with claim 1 wherein said motor comprises an efficiency of approximately 45%.

17. An electric motor comprising:
a stator including a stator core, a first and second lamination stack, a flux tube extending therethrough, and windings on said stator core, wherein each said lamination stack includes a plurality of laminations configured to be stacked together, and each said lamination including:
a body having an outer edge;
a central opening extending through said lamination body and aligned with a stator core central opening;
a plurality of pole pieces extending axially from a lamination outer edge; and
a notch extending through said lamination body from the lamination body central opening to said lamination body, outer edge;
a rotor including a hub having an inner surface, a magnet coupled to said hub inner surface, and a shaft received in said stator core for rotation of said rotor relative to said stator about a longitudinal axis of said shaft; and
a housing adapted to support said stator and said rotor.

18. An electric motor in accordance with claim 17 wherein said stator core includes ribs projecting radially inwardly toward the central opening of said stator core and engaging said pole pieces, said pole pieces shearing material from at least one of said ribs upon assembly of said pole pieces and a flux tube with said stator core so that said at least one rib has a reduced radial thickness.

19. An electric motor in accordance with claim 17 wherein each lamination body comprises four pole pieces, said pole pieces formed by bending each pole piece to an approximate right angle with respect to said lamination body after said lamination body is formed by stamping.

20. An electric motor comprising:
a stator including a stator core, a first and second lamination stack, a flux tube extending through said first and second lamination stack, and a winding on said stator core; each said lamination stack comprising a plurality of laminations configured to be stacked together, each said lamination comprising a body having an outer edge, a central opening aligned with said stator core central opening and configured to receive said flux tube, a plurality of pole pieces extending axially from said lamination outer edge, and a notch extending through said lamination body from said lamination body central opening to said lamination body out edge;
a rotor comprising a hub, an inner surface, a magnet coupled to said hub inner surface, and a shaft received in said stator core for rotation of said rotor relative to said stator about a longitudinal axis of said shaft; and
a housing adapted to support said stator and said rotor.

21. An electric motor in accordance with claim 20 wherein said magnet comprises a first end, a second end, and an inner surface defining a bore extending between said first end and said second end such that a portion of said stator and said rotor shaft extend through said magnet bore.

22. An electric motor in accordance with claim 21 wherein said magnet inner surface comprises at least one of a plurality of projections extending between said magnet first and said magnet second end, a plurality of notches extending between said magnet first end and said magnet second end, a plurality of serrations extending between said magnet first end and said magnet second end and a plurality of skewed serrations extending between said magnet first end and said magnet second end.

23. An electric motor in accordance with claim 20 wherein said magnet outer surface comprises a plurality of serrations extending between said magnet first end and said magnet second end.

24. An electric motor in accordance with claim 20 wherein said motor comprises an efficiency between approximately 30% and 60%.

25. An electric motor in accordance with claim 20 wherein said motor comprises an efficiency between approximately 35% and 50%.

* * * * *

UNITED STATES PATENT AND TRADEMARK OFFICE
CERTIFICATE OF CORRECTION

PATENT NO. : 6,864,616 B2  Page 1 of 1
APPLICATION NO. : 09/974522
DATED : March 8, 2005
INVENTOR(S) : Hollenbeck et al.

It is certified that error appears in the above-identified patent and that said Letters Patent is hereby corrected as shown below:

In Claim 17, column 18, line 10, delete "body, outer" and insert therefor -- body outer --.

In Claim 20, column 18, line 37, delete "out" and insert therefor -- outer--.

Signed and Sealed this

Twentieth Day of November, 2007

JON W. DUDAS
*Director of the United States Patent and Trademark Office*